(12) United States Patent
Rutland et al.

(10) Patent No.: US 10,689,093 B1
(45) Date of Patent: Jun. 23, 2020

(54) VARIABLE PITCH PROPELLER MECHANISMS USING SHAPE MEMORY MATERIALS

(71) Applicant: Amazon Technologies, Inc., Seattle, WA (US)

(72) Inventors: Joseph Rutland, Norfolk (GB); Liam Stewart Cavanaugh Pingree, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 134 days.

(21) Appl. No.: 15/945,652

(22) Filed: Apr. 4, 2018

(51) Int. Cl.
| B64C 11/30 | (2006.01) |
| B64C 11/40 | (2006.01) |
| B64C 11/32 | (2006.01) |
| B64C 11/44 | (2006.01) |
| B64C 11/02 | (2006.01) |
| F03G 7/06 | (2006.01) |

(52) U.S. Cl.
CPC ............... B64C 11/32 (2013.01); B64C 11/02 (2013.01); B64C 11/44 (2013.01); *F03G 7/065* (2013.01)

(58) Field of Classification Search
CPC ......... B64C 11/02; B64C 11/06; B64C 11/30; B64C 11/32; B64C 11/44; B64C 27/78; B64C 27/80; B64C 2027/7288; B64C 2027/7294; F03G 7/065
See application file for complete search history.

(56) References Cited

U.S. PATENT DOCUMENTS

| 5,440,193 | A  | * | 8/1995  | Barrett ................. | B64C 27/001 310/328 |
| 6,135,713 | A  | * | 10/2000 | Domzalski ............ | B64C 27/001 416/104 |
| 6,209,824 | B1 | * | 4/2001  | Caton ...................... | B64C 7/00 244/213 |
| 6,322,324 | B1 | * | 11/2001 | Kennedy ............... | B64C 27/001 244/17.13 |
| 6,465,902 | B1 | * | 10/2002 | Beauchamp ........... | F01D 5/148 244/215 |
| 6,499,952 | B1 | * | 12/2002 | Jacot ...................... | F03G 7/065 416/155 |
| 6,669,444 | B2 | * | 12/2003 | Alacqua ................ | F04D 29/368 416/132 A |
| 7,037,076 | B2 | * | 5/2006  | Jacot ...................... | F03G 7/065 416/155 |
| 2006/0049302 | A1 | * | 3/2006 | Kennedy ............... | B64C 27/473 244/17.11 |

(Continued)

*Primary Examiner* — Igor Kershteyn
(74) *Attorney, Agent, or Firm* — Athorus, PLLC

(57) ABSTRACT

Example variable pitch propulsion mechanisms may include propeller hubs having variable pitch propeller blades. The propeller hubs may include shape memory actuators operatively connected to the propeller blades to change their pitch. In addition, the propeller hubs may include linkage arms to transfer movement from the shape memory actuators to the propeller blades. Further, the propeller hubs may include geared connections to transfer movement from the shape memory actuators to the propeller blades. Moreover, the propeller hubs may include latch mechanisms, similar to retractable pen mechanisms, to transfer movement from the shape memory actuators to the propeller blades and decouple movement of the propeller blades from alignment of the propeller blades.

16 Claims, 7 Drawing Sheets

(56) References Cited

U.S. PATENT DOCUMENTS

2006/0192046 A1* 8/2006 Heath .................... B64C 15/14
                                                                             244/12.3
2017/0036752 A1* 2/2017 Bigbee-Hansen ...... B64C 11/06

* cited by examiner

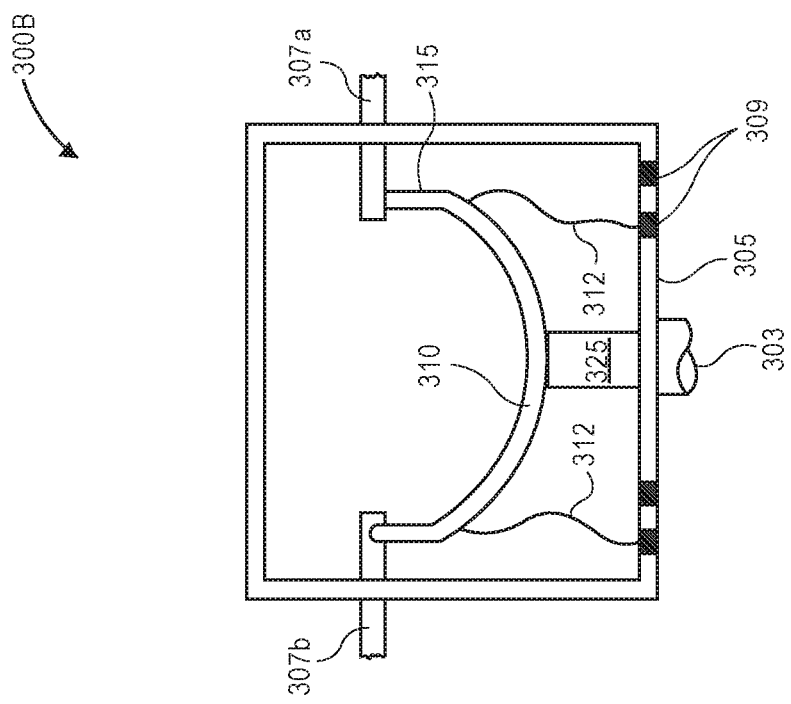
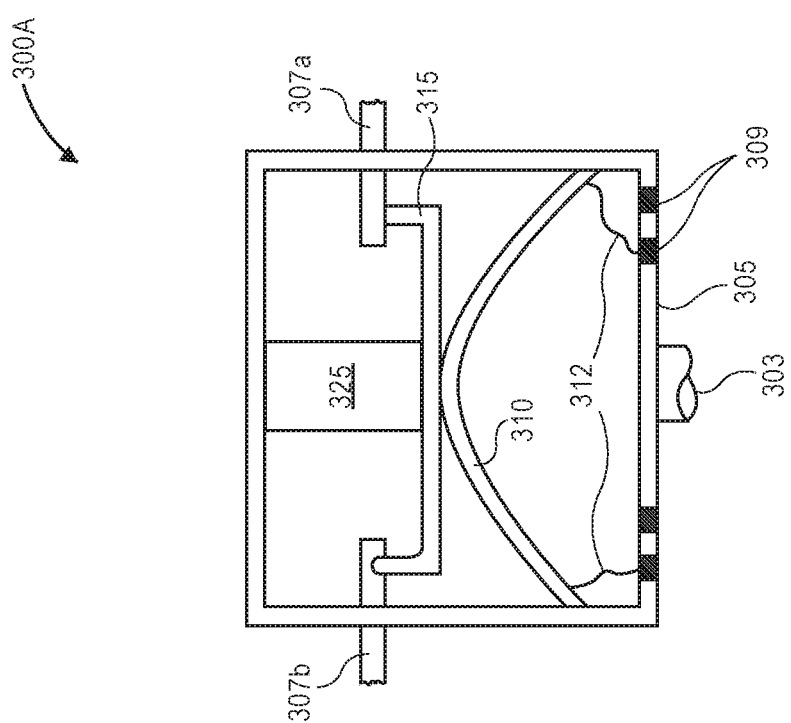

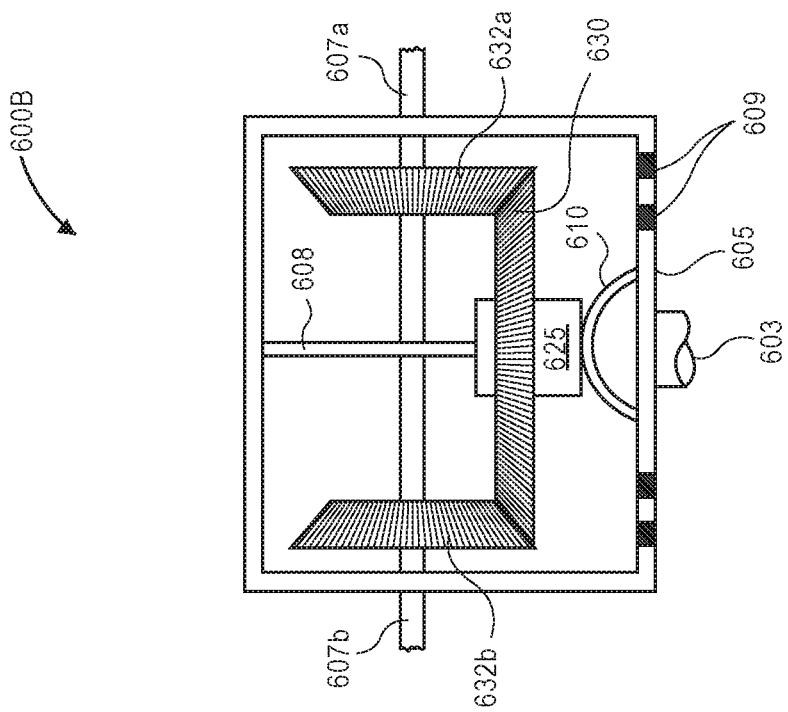
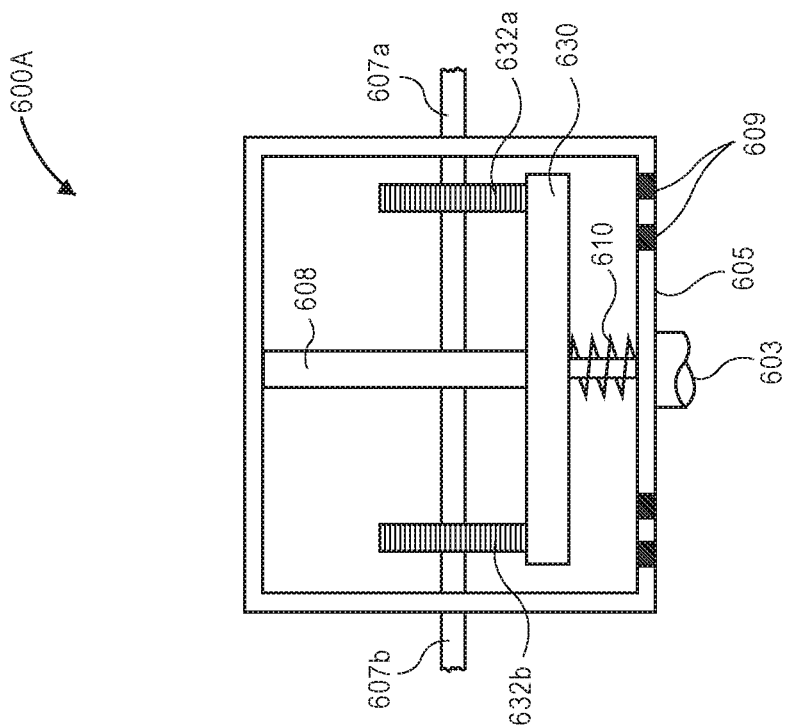

VARIABLE PITCH PROPELLER MECHANISMS USING SHAPE MEMORY MATERIALS

BACKGROUND

Aerial vehicles such as aircraft and helicopters that utilize propellers may use various mechanisms to vary the pitch of propeller blades. However, such mechanisms may be mechanically complex, heavy, and expensive to design, build, and operate. For example, some mechanisms may use combinations of rotating components and non-rotating components that interact with each other to vary the pitch of propeller blades. Accordingly, there is a need to provide mechanisms to vary the pitch of propeller blades with reduced cost, complexity, and weight.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3A is a schematic diagram of a third example variable pitch propeller hub assembly, according to an implementation.

FIG. 3B is a schematic diagram of a fourth example variable pitch propeller hub assembly, according to an implementation.

FIG. 6A is a schematic diagram of a ninth example variable pitch propeller hub assembly, according to an implementation.

FIG. 6B is a schematic diagram of a tenth example variable pitch propeller hub assembly, according to an implementation.

Figure 1:
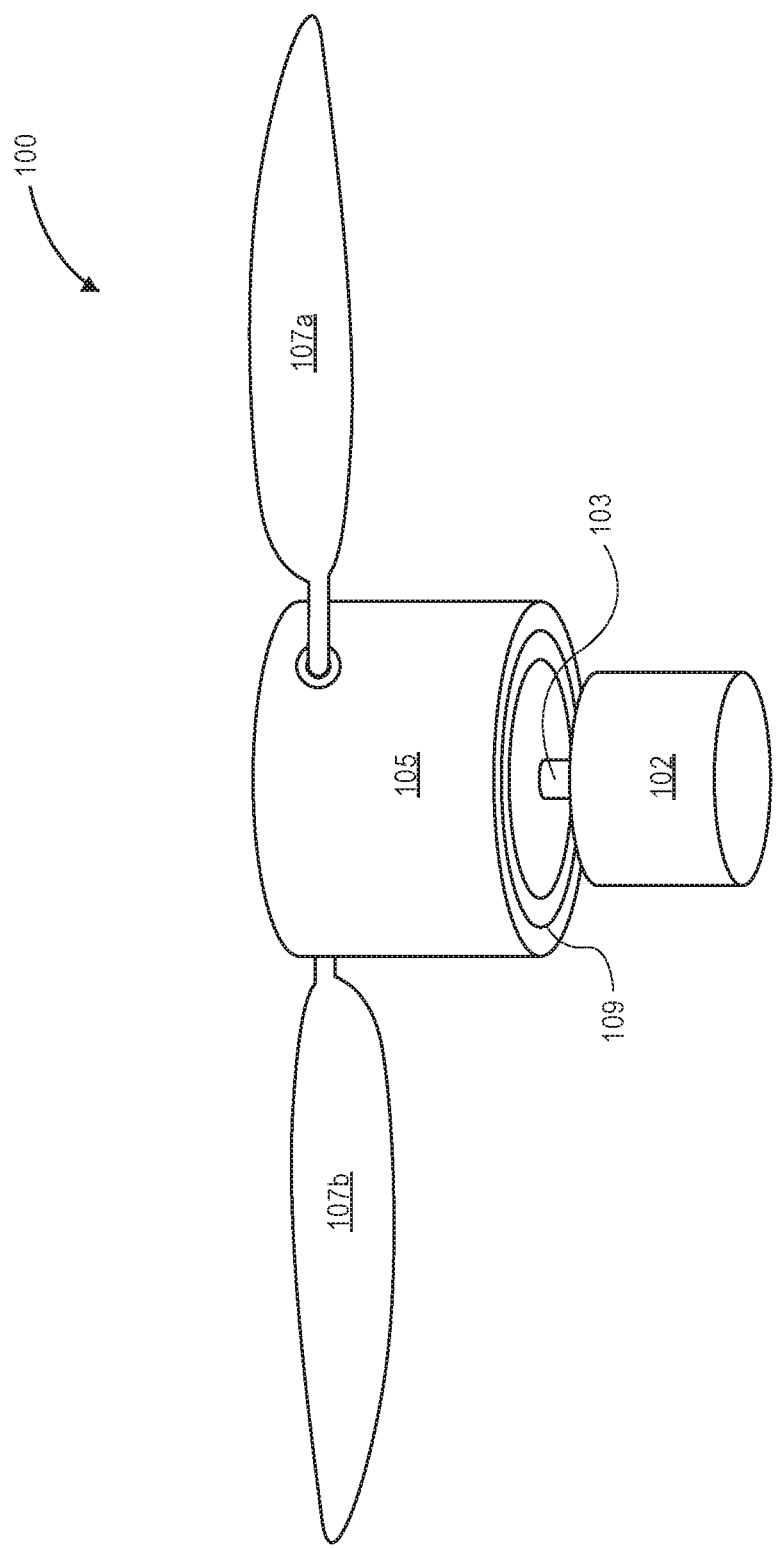
FIG. 1 is a schematic diagram of an example variable pitch propulsion mechanism, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Systems and methods to vary the pitch of a propeller blade using a shape memory actuator are described herein. In addition, systems and methods to vary the pitch of a propeller blade using a latch mechanism are described herein. Further, systems and methods to vary the pitch of a propeller blade using various combinations of shape memory actuators and/or latch mechanisms are described herein.

In example embodiments, a propeller hub may be coupled to and rotated by a motor. The motor may be coupled to a motor arm, frame, fuselage, or other portion of an aerial vehicle to provide thrust to at least a portion of the aerial vehicle. In example embodiments, a plurality of motors and propeller hubs may be coupled to an aerial vehicle to provide thrust. The propeller hub may include one or more propeller blades that are rotatably coupled to the hub. The propeller hub may also include one or more shape memory actuators that may vary the pitch of the one or more propeller blades. The one or more shape memory actuators may be configured in various positions and/or orientations within the propeller hub to vary the pitch of the one or more propeller blades.

In example embodiments, the propeller hub may also include a linkage arm connected between the one or more shape memory actuators and the one or more propeller blades to vary the pitch of the one or more propeller blades. In other example embodiments, the propeller hub may also include a geared connection between the one or more shape memory actuators and the one or more propeller blades to vary the pitch of the one or more propeller blades.

In some example embodiments, the one or more shape memory actuators may be actuated by a current applied to the actuators, by heat applied to the actuators, and/or by a magnetic field applied to the actuators. For example, a current may be applied to the shape memory actuators via an electrical connection to a current source, e.g., using one or more slip rings. In addition, heat may be applied to the shape memory actuators via an electrical connection to a current source and/or a direct or indirect connection to a heat source. Further, a magnetic field may be applied to the shape memory actuators via an electrical current provided by a current source to a component adjacent or around the shape memory actuators, and/or via permanent magnets and/or electromagnets.

In further example embodiments, the propeller hub may include one or more latch mechanisms to maintain a pitch of the one or more propeller blades. For example, the latch mechanisms may decouple movement or rotation of the one or more propeller blades to vary their pitch from positioning or alignment of the one or more propeller blades at the varied pitch. In addition, the one or more latch mechanisms may be configured and operate similar to a pen extension/retraction mechanism, a ballpoint pen extension/retraction mechanism, and/or other similar extension/retraction mechanisms. In an example pen extension/retraction mechanism, the latch mechanism may be configured to move the writing tip of the pen between two positions, i.e., an extended position that exposes the writing tip of the pen, and a retracted position that hides or conceals the writing tip of the pen. In similar manner, the one or more latch mechanisms may be configured to extend and/or retract between two or more positions to vary the pitch of the one or more propeller blades. For example, the one or more latch mechanisms may vary the pitch of the one or more propeller blades between two or more positions, e.g., a first pitch of the one or more propeller blades, a second pitch of the one or more propeller blades that is different from the first pitch, a third pitch of the one or more propeller blades that is different from the first pitch and the second pitch, etc.

FIG. 1 is a schematic diagram of an example variable pitch propulsion mechanism 100, according to an implementation.

The variable pitch propulsion mechanism 100 may include a motor 102 that is coupled to and rotates a propeller hub 105 via a shaft 103. The motor 102 may be coupled to a motor arm, frame, fuselage, or other portion of an aerial vehicle (not shown) to provide thrust to at least a portion of the aerial vehicle. In example embodiments, a plurality of motors 102 and propeller hubs 105 may be coupled to an aerial vehicle to provide thrust. The propeller hub 105 may include one or more propeller blades 107 that are rotatably coupled to the propeller hub 105. In addition, in some example embodiments, the propeller hub 105 may include one or more slip rings 109 via which current, heat, and/or magnetic fields may be applied to one or more shape memory actuators within the propeller hub 105. As further described herein, the propeller hub 105 may include various other components, such as one or more latch mechanisms, linkage arms, and/or geared connections, via which the one or more shape memory actuators may vary the pitch of the one or more propeller blades.

The motor 102 may be any type of motor, such as an inrunner motor or an outrunner motor, that can provide thrust to an aerial vehicle via one or more rotating propellers or propeller blades. In example embodiments, the motor 102 may be an inrunner motor having a rotor that is connected to and rotates the shaft 103. In other example embodiments, the motor 102 may comprise various other types of motors, such as reciprocating piston motors, Stirling motors/engines, Wankel motors/engines, turboprops, turbofans, steam motors/engines, or various other motors that can provide thrust via one or more rotating propellers or propeller blades. The shaft 103 may be made of various materials, including metals, plastics, composites, other materials, or combinations thereof. The shaft 103 may in turn be connected to and rotate the propeller hub 105. The connection between the shaft 103 and propeller hub 105 may include various types of connections, such keyed connections, friction fit connections, integral connections, welded connections, adhesive connections, or other types of connections.

The one or more propeller blades 107 may be rotatably coupled to the propeller hub 105, e.g., via one or more bearings or other rotatable couplings. For example, the rotatable couplings of the one or more propeller blades 107 may allow a change in pitch of each of the one or more propeller blades 107. In addition, the propeller hub 105 and the one or more propeller blades 107 may be made of various materials, including metals, plastics, carbon fiber, Kevlar, composites, other materials, or combinations thereof. Although FIG. 1 shows two propeller blades 107a, 107b rotatably coupled to the propeller hub 105, any other number, combination, or arrangement of propeller blades 107 may be included, such as for example, only a single propeller blade 107 or more than two propeller blades 107.

The one or more slip rings 109 may include electrical and/or thermal connections via which current, heat, and/or magnetic fields may be applied to one or more shape memory actuators within the propeller hub 105. For example, the one or more slip rings 109 may include circular or annular electrical and/or thermal connections on an exterior surface of the propeller hub 105 that may be connected to a current source or a heat source external to the propeller hub 105, e.g., via brushes or other electrically and/or thermally conductive connections.

As shown in FIG. 1, the slip rings 109 may comprise pancake slip rings in which the circular electrical and/or thermal connections are located on the circular end face of the exterior surface of the propeller hub 105. In other example embodiments, the one or more slip rings 109 may be formed on the cylindrical surface of the exterior surface of the propeller hub 105. In further example embodiments, the one or more slip rings 109 may comprise wireless slip rings which may not require electrical connections on an exterior surface of the propeller hub 105. Instead, wireless slip rings may comprise one or more internal electrical coils within the propeller hub 105 in which a current is induced via a magnetic field, and a magnetic field source and/or one or more external electrical coils connected to a current source that generate the magnetic field. In this manner, wireless slip rings may induce a current and/or apply heat to one or more shape memory actuators within the propeller hub 105 without a direct mechanical connection to a magnetic field source and/or one or more external electrical coils connected to a current source external to the propeller hub 105. In still further example embodiments, a magnetic field source and/or one or more external electrical coils connected to a current source may generate and apply a magnetic field to one or more shape memory actuators within the propeller hub 105 without a direct mechanical connection to the propeller hub 105.

The one or more shape memory actuators may be formed from shape memory alloys, shape memory polymers, magnetic shape memory alloys, or other shape memory materials. For example, the various shape memory actuators may expand and/or contract responsive to application of heat and/or responsive to application of magnetic fields. In addition, heat may be applied to the various shape memory actuators by passing or inducing a current through one or more sections of the shape memory actuators, by passing or inducing a current through one or more materials or wires placed adjacent or wrapped around one or more sections of the shape memory actuators, or by otherwise applying heat to one or more sections of the shape memory actuators. Further, magnetic fields may be applied to the various shape memory actuators by passing or inducing a current through one or more materials or wires placed adjacent or wrapped around one or more sections of the shape memory actuators, or by otherwise applying magnetic fields to one or more sections of the shape memory actuators.

Example shape memory alloys may include copper-aluminum-nickel, nickel-titanium (Nitinol, Flexinol), or other alloys. Example magnetic shape memory alloys may include nickel-manganese-gallium, nickel-iron-gallium, or other alloys. Example shape memory polymers may include polyurethane, polyethylene terephthalate, polyethylene oxide, polystyrene, polybutadiene, or other polymers.

In example embodiments, the one or more shape memory actuators may be one-way actuators or two-way actuators. One-way shape memory actuators may remember a single configuration or shape, whereas two-way shape memory actuators may remember two different configurations or shapes. For example, a one-way shape memory actuator having a first configuration or shape may be deformed or otherwise modified to a second configuration or shape, and responsive to application of heat or magnetic fields, the one-way shape memory actuator may return to the first configuration or shape. Generally, a one-way shape memory actuator may return to its first configuration or shape upon applying heat above a transformation temperature associated with a material of the shape memory actuator, or upon applying a first magnetic field to the material of the shape memory actuator. By contrast, a two-way shape memory actuator may have a first configuration or shape at a first temperature (e.g., below a transformation temperature associated with a material of the shape memory actuator) or in a presence of a first magnetic field, and the two-way shape memory actuator may have a second configuration or shape at a second temperature (e.g., above a transformation temperature associated with a material of the shape memory actuator) or in a presence of a second magnetic field that is different from the first magnetic field.

For shape memory alloys, the transformation temperature may be associated with a transition between the martensite phase and the austenite phase of the material of the shape memory alloys. For magnetic shape memory alloys, the configuration or shape change may be caused by magnetically induced reorientation within the martensite phase associated with the material of the magnetic shape memory alloys. For shape memory polymers, the transformation temperature may be associated with a transition between a hard phase and a soft phase of the material of the shape memory polymers.

The one or more shape memory actuators may comprise wires, strands, coils, or other groups or combinations of shape memory materials. In some example embodiments, multiple wires or strands of the same or different shape memory materials may be combined, bunched, coiled, or wrapped into a group to form a rope, wire, rod, beam, or column of larger diameter or size, and/or a relatively solid configuration or shape, such that the resulting shape memory actuator may substantially maintain one or more configurations or shapes in the absence of external forces or deformation.

For example, a one-way shape memory actuator may remember a first configuration, e.g., a substantially straight shape with a defined length. During use, the one-way shape memory actuator may be physically deformed or altered to a second configuration, such as by stretching, compressing, bending, or other physical deformations that alter the shape and/or length of the one-way shape memory actuator. Upon application of heat above a transformation temperature associated with a material of the one-way shape memory actuator, and/or upon application of a first magnetic field associated with the material of the one-way shape memory actuator, the one-way shape memory actuator may return back to the first configuration, e.g., a substantially straight shape with a defined length, from the second, deformed configuration, e.g., a bent shape and/or a shorter or longer length. Although this example refers to a one-way shape memory actuator that remembers a first configuration that is a substantially straight shape with a defined length, one-way shape memory actuators may remember other types of first configurations, including U-shapes, Z-shapes, helical shapes, other bent shapes, and/or shapes with various lengths.

In addition, a two-way shape memory actuator may remember both a first configuration, e.g., a substantially straight shape with a first defined length, and a second configuration, e.g., a bent, U-shape with a second defined length. During use, the two-way shape memory actuator may initially begin with the first configuration, e.g., a substantially straight shape with a first defined length. Upon application of heat above a transformation temperature associated with a material of the two-way shape memory actuator, and/or upon application of a second magnetic field associated with the material of the two-way shape memory actuator, the two-way shape memory actuator may alter its configuration to the second configuration, e.g., a bent, U-shape with a second defined length. Then, upon removal of heat below the transformation temperature associated with the material of the two-way shape memory actuator, and/or upon application of a first magnetic field that is different from the second magnetic field associated with the material of the two-way shape memory actuator, the two-way shape memory actuator may return back to the first configuration, e.g., a substantially straight shape with a defined length, from the second configuration, e.g., a bent, U-shape with a second defined length. Although this example refers to a two-way shape memory actuator that remembers both a first configuration that is a substantially straight shape with a defined length and a second configuration that is a bent, U-shape with a second defined length, two-way shape memory actuators may remember other types and combinations of first configurations and second configurations, including straight shapes, U-shapes, Z-shapes, helical shapes, other bent shapes, and/or shapes with various lengths. Further, other example shape memory actuators that may be included in the example embodiments described herein may remember more than two particular configurations.

In further example embodiments, shape memory actuators having more precise controllability may also be used to vary pitch of one or more propeller blades of a propeller hub of an aerial vehicle. For example, a plurality of sections of shape memory actuators may be connected in series, and each of the plurality of sections may be individually controllable. In some example embodiments, one or more sections of the shape memory actuators may be heated independently of other sections to control their configurations or shapes, one or more sections of the shape memory actuators may experience applied magnetic fields independently of other sections to control their configurations or shapes, and/or one or more sections of the shape memory actuators may experience applied or induced currents independently of other sections to control their configurations or shapes. In further example embodiments, the shape memory actuators, such as a plurality of sections of shape memory actuators connected in series, may also be formed as part of or included within a base material, such that alteration of the configurations or shapes of one or more sections of the shape memory actuators may controllably alter an overall configuration or shape of the base material.

Figure 2A:
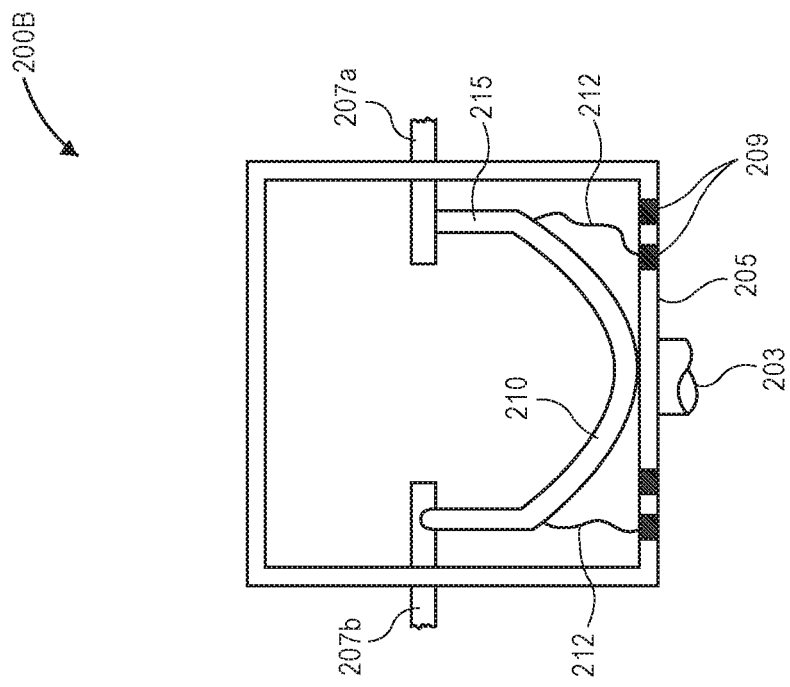
FIG. 2A is a schematic diagram of a first example variable pitch propeller hub assembly, according to an implementation.

FIG. 2A is a schematic diagram of a first example variable pitch propeller hub assembly 200A, according to an implementation.

The propeller hub assembly 200A may include a propeller hub 205 coupled to and rotated by a shaft 203 that is rotated by a motor (not shown). The propeller hub 205 may include one or more propeller blades 207 that are rotatably coupled to the propeller hub 205. In addition, in some example embodiments, the propeller hub 205 may include one or more slip rings 209 via which current, heat, and/or magnetic fields may be applied to one or more shape memory actuators within the propeller hub 205. Various features or aspects of the motor, shaft 203, propeller hub 205, propeller blades 207, and/or slip rings 209 may be similar to or combined with the description herein of related components.

As shown in FIG. 2A, the propeller hub 205 may include one or more shape memory actuators 210, which may be connected to the one or more slip rings 209 via one or more electrical and/or thermal connections 212, such as wires or leads. Further, the propeller hub 205 may include one or more linkage arms 215 operatively connected between the one or more shape memory actuators 210 and the one or more propeller blades 207. In addition, the propeller hub 205 may also include one or more bias elements 220, e.g., springs or other resilient elements, operatively connected to the one or more linkage arms 215 and/or the one or more shape memory actuators 210.

The shape memory actuators 210 may be attached or coupled to an interior of the propeller hub 205. For example, ends of the shape memory actuators 210 may be pivotably attached to an interior surface of the propeller hub 205. In addition, the shape memory actuators 210 may move or alter their size, shape, length, and/or other dimensions between two or more positions or configurations responsive to actuation upon application of current, heat, and/or magnetic fields. For example, the shape memory actuators 210 may move between substantially straight configurations and substantially bent, or U-shaped, configurations.

The linkage arms 215 may be operatively connected to the shape memory actuators 210 such that movement or alteration of the shape memory actuators causes a corresponding movement of the linkage arms 215. For example, the linkage arms 215 may be coupled to the shape memory actuators 210 such that upward movement of the shape memory actuators 210 causes corresponding upward movement of the linkage arms 215, and vice versa. In addition, the linkage arms 215 may also be operatively connected to the propeller blades 207, e.g., on cylindrical, circular, or otherwise rotating surfaces of roots of the propeller blades, such that movement of the linkage arms 215 causes corresponding rotation of the propeller blades 207. For example, the linkage arms 215 may be coupled to the propeller blades 207 such that upward movement of the linkage arms 215 causes corresponding rotation of the propeller blades 207 in a first direction, and downward movement of the linkage arms 215 causes corresponding rotation of the propeller blades 207 in a second, opposite direction. The linkage arms 215 may be coupled to multiple propeller blades 207 such that a particular movement of the linkage arms 215, e.g., upward or downward movement, causes rotation of the multiple propeller blades 207 in a same direction, e.g., either clockwise or counterclockwise.

The bias elements 220 may be attached or coupled to an interior of the propeller hub 205. For example, first ends of the bias elements 220 may be coupled to an interior of the propeller hub 205, and second ends of the bias elements 220 may be coupled to the linkage arms 215 and/or the shape memory actuators 210. The bias elements 220 may be configured to counteract the movement or alteration of size, shape, length, and/or other dimensions of the shape memory actuators 210 to assist the rotation of the propeller blades 207 between two or more positions. For example, if the shape memory actuator 210 is a one-way shape memory actuator, the bias element 220 may be configured to counteract the force exerted by the shape memory actuator 210 upon application of heat, current, and/or magnetic field, such that the bias element 220 may deform the shape memory actuator 210 when not actuated by application of heat, current, and/or magnetic field.

By selectively and/or controllably actuating the shape memory actuators 210 to move the linkage arms 215 and rotate the propeller blades 207, the pitches of the propeller blades 207 may be precisely and controllably adjusted as desired between two or more positions. Although FIG. 2A shows one shape memory actuator 210, one linkage arm 215, two propeller blades 207a, 207b, and one bias element 220, any other number, combination, or arrangement of shape memory actuators, linkage arms, propeller blades, and/or bias elements may be used within the propeller hub assembly 200A. For example, the shape memory actuator may be a two-way shape memory actuator, and no bias elements may be included. In addition, multiple shape memory actuators may be used to move the linkage arm and rotate the propeller blades between two or more positions, in which each shape memory actuator can rotate the propeller blades to a respective different position. Further, the shape memory actuator may comprise a plurality of shape memory actuators connected in series, each of which may be selectively actuated to more precisely control the alteration in size, shape, length, or other dimensions of the shape memory actuator and rotate the propeller blades between multiple positions. Moreover, a plurality of linkage arms may each be connected to a respective propeller blade to independently control its rotation with respect to rotation of other propeller blades.

Figure 2B:
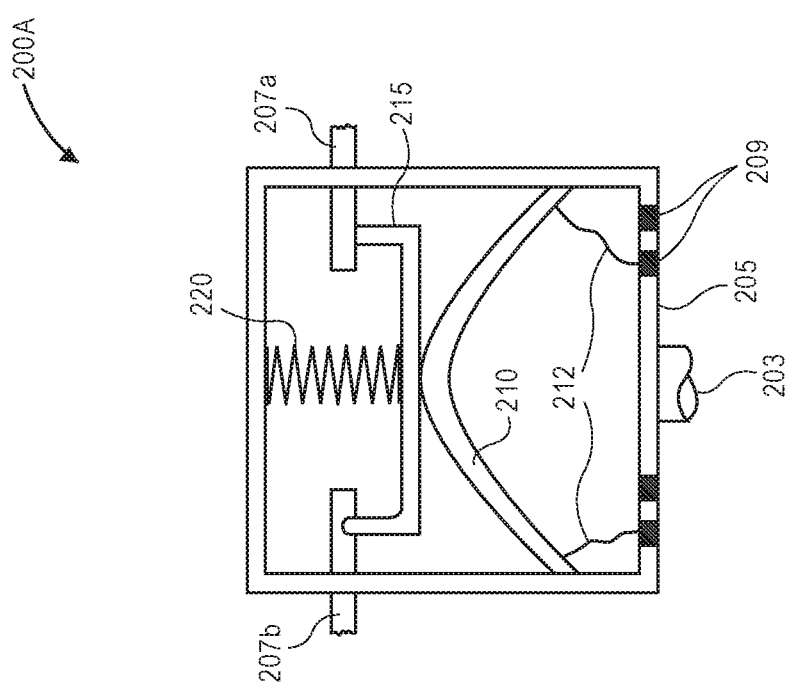
FIG. 2B is a schematic diagram of a second example variable pitch propeller hub assembly, according to an implementation.

FIG. 2B is a schematic diagram of a second example variable pitch propeller hub assembly 200B, according to an implementation.

The propeller hub assembly 200B may include a propeller hub 205 coupled to and rotated by a shaft 203 that is rotated by a motor (not shown). The propeller hub 205 may include one or more propeller blades 207 that are rotatably coupled to the propeller hub 205. In addition, in some example embodiments, the propeller hub 205 may include one or more slip rings 209 via which current, heat, and/or magnetic fields may be applied to one or more shape memory actuators within the propeller hub 205. Various features or aspects of the motor, shaft 203, propeller hub 205, propeller blades 207, and/or slip rings 209 may be similar to or combined with the description herein of related components.

As shown in FIG. 2B, the propeller hub 205 may include one or more shape memory actuators 210, which may be connected to the one or more slip rings 209 via one or more electrical and/or thermal connections 212, such as wires or leads. Further, the propeller hub 205 may include one or more linkage arms 215 operatively connected to the one or more propeller blades 207, and the one or more shape memory actuators 210 may be integrally formed, or form at least a part of, the one or more linkage arms 215. In addition, the propeller hub 205 may also include one or more bias elements (not shown), e.g., springs or other resilient elements, operatively connected to the one or more linkage arms 215 and/or the one or more shape memory actuators 210.

The shape memory actuators 210 may be attached or coupled to an interior of the propeller hub 205. For example, a portion of the shape memory actuators 210 may be pivotably attached to an interior surface of the propeller hub 205. In addition, the shape memory actuators 210 may move or alter their size, shape, length, and/or other dimensions between two or more positions or configurations responsive to actuation upon application of current, heat, and/or magnetic fields. For example, the shape memory actuators 210 may move between substantially straight configurations and substantially bent, or U-shaped, configurations.

The linkage arms 215, or at least a part thereof, may be formed integrally with the shape memory actuators 210 such that movement or alteration of the shape memory actuators 210 causes a corresponding movement of the linkage arms 215. In addition, the linkage arms 215 and integral shape memory actuators 210 may also be operatively connected to the propeller blades 207, e.g., on cylindrical, circular, or otherwise rotating surfaces of roots of the propeller blades, such that movement of the linkage arms 215 and integral shape memory actuators 210 causes corresponding rotation of the propeller blades 207. For example, the linkage arms 215 and integral shape memory actuators 210 may be coupled to the propeller blades 207 such that upward movement of the linkage arms 215 and integral shape memory actuators 210 causes corresponding rotation of the propeller blades 207 in a first direction, and downward movement of the linkage arms 215 and integral shape memory actuators 210 causes corresponding rotation of the propeller blades 207 in a second, opposite direction. The linkage arms 215 and integral shape memory actuators 210 may be coupled to multiple propeller blades 207 such that a particular movement of the linkage arms 215 and integral shape memory actuators 210, e.g., upward or downward movement, causes rotation of the multiple propeller blades 207 in a same direction, e.g., either clockwise or counterclockwise.

By selectively and/or controllably actuating the integral shape memory actuators 210 to move the linkage arms 215 and rotate the propeller blades 207, the pitches of the propeller blades 207 may be precisely and controllably adjusted as desired between two or more positions. Although FIG. 2B shows one integral shape memory actuator 210, one linkage arm 215, two propeller blades 207a, 207b, and no bias elements, any other number, combination, or arrangement of shape memory actuators, linkage arms, propeller blades, and/or bias elements may be used within the propeller hub assembly 200B. For example, the shape memory actuator may be a one-way shape memory actuator, a two-way shape memory actuator, and/or one or more bias elements may be included. In addition, multiple integral shape memory actuators may be used to move a linkage arm and rotate the propeller blades between two or more positions, in which each shape memory actuator can rotate the propeller blades to a respective different position. Further, the shape memory actuator may comprise a plurality of shape memory actuators connected in series, each of which may be selectively actuated to more precisely control the alteration in size, shape, length, or other dimensions of the shape memory actuator and rotate the propeller blades between multiple positions. Moreover, a plurality of linkage arms and integral shape memory actuators may each be connected to a respective propeller blade to independently control its rotation with respect to rotation of other propeller blades.

FIG. 3A is a schematic diagram of a third example variable pitch propeller hub assembly 300A, according to an implementation.

The propeller hub assembly 300A may include a propeller hub 305 coupled to and rotated by a shaft 303 that is rotated by a motor (not shown). The propeller hub 305 may include one or more propeller blades 307 that are rotatably coupled to the propeller hub 305. In addition, in some example embodiments, the propeller hub 305 may include one or more slip rings 309 via which current, heat, and/or magnetic fields may be applied to one or more shape memory actuators within the propeller hub 305. Various features or aspects of the motor, shaft 303, propeller hub 305, propeller blades 307, and/or slip rings 309 may be similar to or combined with the description herein of related components.

As shown in FIG. 3A, the propeller hub 305 may include one or more shape memory actuators 310, which may be connected to the one or more slip rings 309 via one or more electrical and/or thermal connections 312, such as wires or leads. Further, the propeller hub 305 may include one or more linkage arms 315 operatively connected between the one or more shape memory actuators 310 and the one or more propeller blades 307. In addition, the propeller hub 305 may also include one or more latch mechanisms 325, e.g., pen extension/retraction mechanisms, ballpoint pen extension/retraction mechanisms, and/or other similar extension/retraction mechanisms, operatively connected to the one or more linkage arms 315 and/or the one or more shape memory actuators 310.

The shape memory actuators 310 may be attached or coupled to an interior of the propeller hub 305. For example, ends of the shape memory actuators 310 may be pivotably attached to an interior surface of the propeller hub 305. In addition, the shape memory actuators 310 may move or alter their size, shape, length, and/or other dimensions between two or more positions or configurations responsive to actuation upon application of current, heat, and/or magnetic fields. For example, the shape memory actuators 310 may move between substantially straight configurations and substantially bent, or U-shaped, configurations.

The linkage arms 315 may be operatively connected to the shape memory actuators 310 such that movement or alteration of the shape memory actuators causes a corresponding movement of the linkage arms 315. For example, the linkage arms 315 may be moved by the shape memory actuators 310 such that upward movement of the shape memory actuators 310 causes corresponding upward movement of the linkage arms 315, and vice versa. In addition, the linkage arms 315 may also be operatively connected to the propeller blades 307, e.g., on cylindrical, circular, or otherwise rotating surfaces of roots of the propeller blades, such that movement of the linkage arms 315 causes corresponding rotation of the propeller blades 307. For example, the linkage arms 315 may be coupled to the propeller blades 307 such that upward movement of the linkage arms 315 causes corresponding rotation of the propeller blades 307 in a first direction, and downward movement of the linkage arms 315 causes corresponding rotation of the propeller blades 307 in a second, opposite direction. The linkage arms 315 may be coupled to multiple propeller blades 307 such that a particular movement of the linkage arms 315, e.g., upward or downward movement, causes rotation of the multiple propeller blades 307 in a same direction, e.g., either clockwise or counterclockwise.

The latch mechanisms 325 may be attached or coupled to an interior of the propeller hub 305. For example, first ends of the latch mechanisms 325 may be coupled to an interior of the propeller hub 305, and second ends of the latch mechanisms 325 may be coupled to the linkage arms 315.

The latch mechanisms 325 may include extension/retraction mechanisms similar to those included in writing implements such as retractable ballpoint pens, in which various interfacing components are spring-loaded or biased relative to each other and axial compression of one component from a first axial position (e.g., associated with a retracted writing tip of a pen) may cause rotation of one or more components within the mechanism, and the compressed component may return to a second axial position (e.g., associated with an extended writing tip of a pen) different from the first axial position due to force from the spring or other bias element. An additional axial compression of the component may then cause further rotation of one or more components within the mechanism, and the compressed component may return to the first axial position (e.g., associated with the retracted writing tip of the pen), due to force from the spring or other bias element. In this manner, such extension/retraction mechanisms may include one or more components that move between two positions, e.g., the first axial position and the second axial position, responsive to actuation of the mechanisms.

In other example embodiments, the latch mechanisms 325 may be modified from the extension/retraction mechanisms included in writing implements such as retractable ballpoint pens to include more than two axial positions of the compressed component. In this manner, such extension/retraction mechanisms may include one or more components that move between two, three, or more positions, e.g., a first axial position, a second axial position, a third axial position, etc., responsive to actuation of the mechanisms. Such mechanisms may generally cycle through the various axial positions in a defined sequence.

In some example embodiments, the latch mechanisms 325 may be configured to hold a particular position of the linkage arms 315 upon actuation by the shape memory actuators 310, and thereby hold a particular rotational position of the propeller blades 307 via the linkage arms 315. For example, the shape memory actuators 310 may be actuated upon application of current, heat, and/or magnetic fields, and responsive to such actuation, the latch mechanisms 325 may move to a next axial position in a defined sequence of positions. Due to the connection between the latch mechanisms 325 and the linkage arms 315, the current axial position of the latch mechanisms 325 may correspond to a particular position of the linkage arms 315 and a corresponding rotational position of the propeller blades 307. In this manner, the shape memory actuators 310 may operate substantially as basic actuators, such that the shape memory actuators 310 may not need to be continuously actuated to hold a particular position, thereby reducing power consumption, because the latch mechanisms 325 can operate to hold the particular position of the linkage arms 315 and a corresponding rotational position of the propeller blades 307.

By selectively and/or controllably actuating the shape memory actuators 310 to actuate the latch mechanisms 325 and move the linkage arms 315 and rotate the propeller blades 307, the pitches of the propeller blades 307 may be precisely and controllably adjusted as desired between two or more positions. Although FIG. 3A shows one shape memory actuator 310, one linkage arm 315, two propeller blades 307a, 307b, and one latch mechanism 325, any other number, combination, or arrangement of shape memory actuators, linkage arms, propeller blades, and/or latch mechanisms may be used within the propeller hub assembly 300A. For example, the shape memory actuator may be a one-way shape memory actuator, a two-way shape memory actuator, or a plurality of shape memory actuators connected in series, each of which may be selectively actuated to more precisely control the alteration in size, shape, length, or other dimensions. In addition, a plurality of shape memory actuators may each be used to actuate a respective latch mechanism and move a respective linkage arm to independently control rotation of a respective propeller blade with respect to rotation of other propeller blades.

In further example embodiments, instead of or in addition to the shape memory actuators 310, various other types of actuators may be used to actuate the latch mechanisms. For example, servos, solenoids, linear actuators, or various other types of actuators may be used to actuate the latch mechanisms.

FIG. 3B is a schematic diagram of a fourth example variable pitch propeller hub assembly 300B, according to an implementation.

The propeller hub assembly 300B may include a propeller hub 305 coupled to and rotated by a shaft 303 that is rotated by a motor (not shown). The propeller hub 305 may include one or more propeller blades 307 that are rotatably coupled to the propeller hub 305. In addition, in some example embodiments, the propeller hub 305 may include one or more slip rings 309 via which current, heat, and/or magnetic fields may be applied to one or more shape memory actuators within the propeller hub 305. Various features or aspects of the motor, shaft 303, propeller hub 305, propeller blades 307, and/or slip rings 309 may be similar to or combined with the description herein of related components.

As shown in FIG. 3B, the propeller hub 305 may include one or more shape memory actuators 310, which may be connected to the one or more slip rings 309 via one or more electrical and/or thermal connections 312, such as wires or leads. Further, the propeller hub 305 may include one or more linkage arms 315 operatively connected to the one or more propeller blades 307, and the one or more shape memory actuators 310 may be integrally formed, or form at least a part of, the one or more linkage arms 315. In addition, the propeller hub 305 may also include one or more latch mechanisms 325, e.g., pen extension/retraction mechanisms, ballpoint pen extension/retraction mechanisms, and/or other similar extension/retraction mechanisms, operatively connected to the one or more linkage arms 315 and/or the one or more shape memory actuators 310.

The shape memory actuators 310 may be attached or coupled to an interior of the propeller hub 305. For example, a portion of the shape memory actuators 310 may be pivotably attached to an interior surface of the propeller hub 305. In addition, the shape memory actuators 310 may move or alter their size, shape, length, and/or other dimensions between two or more positions or configurations responsive to actuation upon application of current, heat, and/or magnetic fields. For example, the shape memory actuators 310 may move between substantially straight configurations and substantially bent, or U-shaped, configurations.

The linkage arms 315, or at least a part thereof, may be formed integrally with the shape memory actuators 310 such that movement or alteration of the shape memory actuators 310 causes a corresponding movement of the linkage arms 315. In addition, the linkage arms 315 and integral shape memory actuators 310 may also be operatively connected to the propeller blades 307, e.g., on cylindrical, circular, or otherwise rotating surfaces of roots of the propeller blades, such that movement of the linkage arms 315 and integral shape memory actuators 310 causes corresponding rotation of the propeller blades 307. For example, the linkage arms 315 and integral shape memory actuators 310 may be coupled to the propeller blades 307 such that upward movement of the linkage arms 315 and integral shape memory actuators 310 causes corresponding rotation of the propeller blades 307 in a first direction, and downward movement of the linkage arms 315 and integral shape memory actuators 310 causes corresponding rotation of the propeller blades 307 in a second, opposite direction. The linkage arms 315 and integral shape memory actuators 310 may be coupled to multiple propeller blades 307 such that a particular movement of the linkage arms 315 and integral shape memory actuators 310, e.g., upward or downward movement, causes rotation of the multiple propeller blades 307 in a same direction, e.g., either clockwise or counterclockwise.

The latch mechanisms 325 may be attached or coupled to an interior of the propeller hub 305. For example, first ends of the latch mechanisms 325 may be coupled to an interior of the propeller hub 305, and second ends of the latch mechanisms 325 may be coupled to the linkage arms 315 and integral shape memory actuators 310.

The latch mechanisms 325 may include extension/retraction mechanisms similar to those included in writing implements such as retractable ballpoint pens, in which various interfacing components are spring-loaded or biased relative to each other and axial compression of one component from a first axial position (e.g., associated with a retracted writing tip of a pen) may cause rotation of one or more components within the mechanism, and the compressed component may return to a second axial position (e.g., associated with an extended writing tip of a pen) different from the first axial position due to force from the spring or other bias element. An additional axial compression of the component may then cause further rotation of one or more components within the mechanism, and the compressed component may return to the first axial position (e.g., associated with the retracted writing tip of the pen), due to force from the spring or other bias element. In this manner, such extension/retraction mechanisms may include one or more components that move between two positions, e.g., the first axial position and the second axial position, responsive to actuation of the mechanisms.

In other example embodiments, the latch mechanisms 325 may be modified from the extension/retraction mechanisms included in writing implements such as retractable ballpoint pens to include more than two axial positions of the compressed component. In this manner, such extension/retraction mechanisms may include one or more components that move between two, three, or more positions, e.g., a first axial position, a second axial position, a third axial position, etc., responsive to actuation of the mechanisms. Such mechanisms may generally cycle through the various axial positions in a defined sequence.

In some example embodiments, the latch mechanisms 325 may be configured to hold a particular position of the linkage arms 315 and integral shape memory actuators 310 upon actuation by the shape memory actuators 310, and thereby hold a particular rotational position of the propeller blades 307 via the linkage arms 315 and integral shape memory actuators 310. For example, the shape memory actuators 310 may be actuated upon application of current, heat, and/or magnetic fields, and responsive to such actuation, the latch mechanisms 325 may move to a next axial position in a defined sequence of positions. Due to the connection between the latch mechanisms 325 and the linkage arms 315 and integral shape memory actuators 310, the current axial position of the latch mechanisms 325 may correspond to a particular position of the linkage arms 315 and integral shape memory actuators 310 and a corresponding rotational position of the propeller blades 307. In this manner, the shape memory actuators 310 may operate substantially as basic actuators, such that the shape memory actuators 310 may not need to be continuously actuated to hold a particular position, thereby reducing power consumption, because the latch mechanisms 325 can operate to hold the particular position of the linkage arms 315 and integral shape memory actuators 310 and a corresponding rotational position of the propeller blades 307.

By selectively and/or controllably actuating the integral shape memory actuators 310 to actuate the latch mechanisms 325 and move the linkage arms 315 and rotate the propeller blades 307, the pitches of the propeller blades 307 may be precisely and controllably adjusted as desired between two or more positions. Although FIG. 3B shows one integral shape memory actuator 310, one linkage arm 315, two propeller blades 307a, 307b, and one latch mechanism 325, any other number, combination, or arrangement of shape memory actuators, linkage arms, propeller blades, and/or latch mechanisms may be used within the propeller hub assembly 300B. For example, the shape memory actuator may be a one-way shape memory actuator, a two-way shape memory actuator, or a plurality of shape memory actuators connected in series, each of which may be selectively actuated to more precisely control the alteration in size, shape, length, or other dimensions. In addition, a plurality of shape memory actuators may each be used to actuate a respective latch mechanism and move a respective linkage arm to independently control rotation of a respective propeller blade with respect to rotation of other propeller blades.

Figures 4A, 4B:
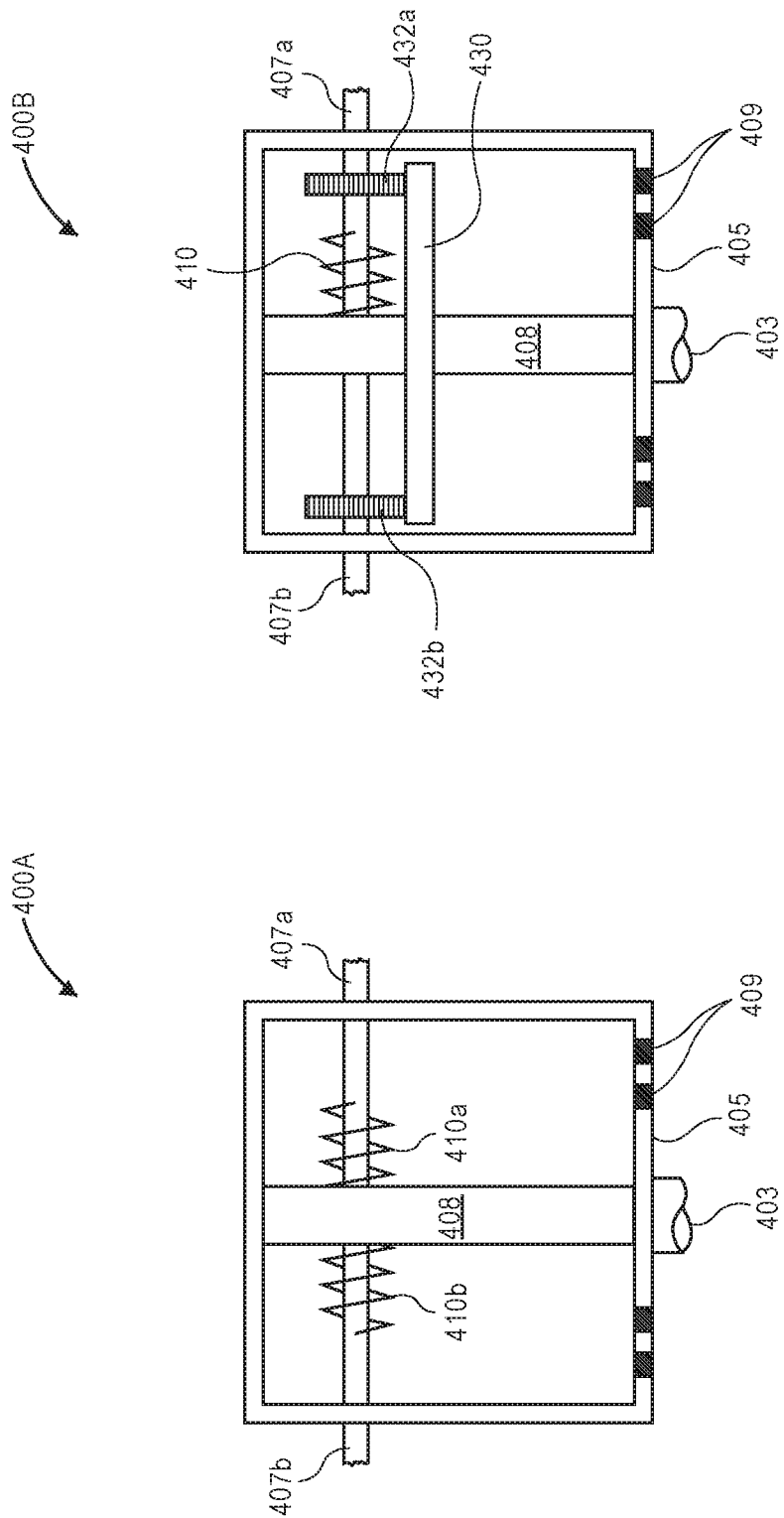
FIG. 4A is a schematic diagram of a fifth example variable pitch propeller hub assembly, according to an implementation.
FIG. 4B is a schematic diagram of a sixth example variable pitch propeller hub assembly, according to an implementation.

FIG. 4A is a schematic diagram of a fifth example variable pitch propeller hub assembly 400A, according to an implementation.

The propeller hub assembly 400A may include a propeller hub 405 coupled to and rotated by a shaft 403 that is rotated by a motor (not shown). The propeller hub 405 may include one or more propeller blades 407 that are rotatably coupled to the propeller hub 405. In addition, in some example embodiments, the propeller hub 405 may include one or more slip rings 409 via which current, heat, and/or magnetic fields may be applied to one or more shape memory actuators within the propeller hub 405. Various features or aspects of the motor, shaft 403, propeller hub 405, propeller blades 407, and/or slip rings 409 may be similar to or combined with the description herein of related components.

As shown in FIG. 4A, the propeller hub 405 may include one or more shape memory actuators 410, e.g., helical, angular, or rotational shape memory actuators, which may be connected to the one or more slip rings 409 via one or more electrical and/or thermal connections, such as wires or leads (not shown). Further, the propeller hub 405 may include one or more support members 408 to which the one or more shape memory actuators 410 may be coupled. In addition, the one or more propeller blades 407 may be rotatably coupled to the one or more support members 408.

The shape memory actuators 410 may be attached or coupled to the support members 408 of the propeller hub 405. For example, first ends of the shape memory actuators 410 may be attached to the support members 408 of the propeller hub 405. Further, second ends of the shape memory actuators 410 may be attached to the propeller blades 407, e.g., on cylindrical, circular, or otherwise rotating surfaces of roots of the propeller blades, such that movement or alteration of the shape memory actuators 410 causes corresponding rotation of the propeller blades 407. For example, the shape memory actuators 410 may be coupled to the propeller blades 407 such that rotation of the shape memory actuators 410 in a first direction causes corresponding rotation of the propeller blades 407 in the first direction, and rotation of the shape memory actuators 410 in a second, opposite direction causes corresponding rotation of the propeller blades 407 in the second direction. In addition, the shape memory actuators 410 may move or alter their size, shape, length, and/or other dimensions between two or more positions or configurations responsive to actuation upon application of current, heat, and/or magnetic fields. For example, the shape memory actuators 410 may move between a first angular or rotational orientation and a second angular or rotational orientation different from the first orientation.

By selectively and/or controllably actuating the shape memory actuators 410 to rotate the propeller blades 407, the pitches of the propeller blades 407 may be precisely and controllably adjusted as desired between two or more positions. Although FIG. 4A shows two shape memory actuators 410a, 410b, two propeller blades 407a, 407b, and one support member 408, any other number, combination, or arrangement of shape memory actuators, propeller blades, and/or support members may be used within the propeller hub assembly 400A. For example, the shape memory actuators may be one-way shape memory actuators in combination with bias elements, two-way shape memory actuators, or a plurality of shape memory actuators connected in series, each of which may be selectively actuated to more precisely control the alteration in size, shape, length, or other dimensions. In addition, a plurality of propeller blades may each be rotatably coupled to a respective support member 408. Further, each shape memory actuator may independently control rotation of a respective propeller blade with respect to rotation of other propeller blades.

FIG. 4B is a schematic diagram of a sixth example variable pitch propeller hub assembly 400B, according to an implementation.

The propeller hub assembly 400B may include a propeller hub 405 coupled to and rotated by a shaft 403 that is rotated by a motor (not shown). The propeller hub 405 may include one or more propeller blades 407 that are rotatably coupled to the propeller hub 405. In addition, in some example embodiments, the propeller hub 405 may include one or more slip rings 409 via which current, heat, and/or magnetic fields may be applied to one or more shape memory actuators within the propeller hub 405. Various features or aspects of the motor, shaft 403, propeller hub 405, propeller blades 407, and/or slip rings 409 may be similar to or combined with the description herein of related components.

As shown in FIG. 4B, the propeller hub 405 may include a shape memory actuator 410, e.g., helical, angular, or rotational shape memory actuator, which may be connected to the one or more slip rings 409 via one or more electrical and/or thermal connections, such as wires or leads (not shown). Further, the propeller hub 405 may include one or more support members 408 to which the shape memory actuator 410 may be coupled. In addition, the one or more propeller blades 407 may be rotatably coupled to the one or more support members 408. Moreover, the propeller hub 405 may include a geared connection, comprising a first portion 430 and second portions 432, that is operatively connected between the shape memory actuator 410 and the one or more propeller blades 407.

The shape memory actuator 410 may be attached or coupled to the support member 408 of the propeller hub 405. For example, a first end of the shape memory actuator 410 may be attached to the support member 408 of the propeller hub 405. Further, a second end of the shape memory actuator 410 may be attached to a propeller blade 407, e.g., on cylindrical, circular, or otherwise rotating surfaces of a root of the propeller blade, such that movement or alteration of the shape memory actuator 410 causes corresponding rotation of the propeller blade 407. For example, the shape memory actuator 410 may be coupled to the propeller blade 407 such that rotation of the shape memory actuator 410 in a first direction causes corresponding rotation of the propeller blade 407 in the first direction, and rotation of the shape memory actuator 410 in a second, opposite direction causes corresponding rotation of the propeller blade 407 in the second direction. In addition, the shape memory actuator 410 may move or alter its size, shape, length, and/or other dimensions between two or more positions or configurations responsive to actuation upon application of current, heat, and/or magnetic fields. For example, the shape memory actuator 410 may move between a first angular or rotational orientation and a second angular or rotational orientation different from the first orientation.

The geared connection may be operatively connected between the shape memory actuator 410 and the one or more propeller blades 407 in order to transfer the rotation of the shape memory actuator 410 to others of the one or more propeller blades 407. For example, the first portion 430 of the geared connection may be rotatably coupled to the support member 408, and may comprise gear teeth along a circular or annular ring of a circular surface. In addition, the second portions 432 may each be coupled to a root or shaft of a respective propeller blade 407, and may comprise gears having gear teeth that mate with the gear teeth of the first portion 430. In this manner, rotation of a first propeller blade 407a upon actuation of the shape memory actuator 410 that is directly coupled thereto may be transferred via the geared connection, e.g., via a second portion 432a coupled to the first propeller blade 407a, the first portion 430, and a second portion 432b coupled to a second propeller blade 407b, to cause corresponding rotation of the second propeller blade 407b.

By selectively and/or controllably actuating the shape memory actuator 410 to rotate the propeller blades 407, the pitches of the propeller blades 407 may be precisely and controllably adjusted as desired between two or more positions. Although FIG. 4B shows one shape memory actuator 410, two propeller blades 407a, 407b, one support member 408, and one geared connection comprising a first portion 430 and two second portions 432a, 432b, any other number, combination, or arrangement of shape memory actuators, propeller blades, support members, and/or geared connections may be used within the propeller hub assembly 400B. For example, the shape memory actuator may be a one-way shape memory actuator in combination with a bias element, a two-way shape memory actuator, or a plurality of shape memory actuators connected in series, each of which may be selectively actuated to more precisely control the alteration in size, shape, length, or other dimensions. In addition, more than two propeller blades may be operatively connected to the shape memory actuator via the geared connection. Further, a plurality of propeller blades may each be rotatably coupled to a respective support member 408. Moreover, although FIG. 4B shows the first portion of the geared connection as a substantially flat disc having gear teeth on an upper surface, and the second portions of the geared connection as substantially spur gears, e.g., similar to a circular rack and pinion gear configuration, the first and second portions of the geared connection may comprise other types of gears, e.g., bevel gears which may be combinations of straight bevel gears or combinations of spiral bevel gears.

Figure 5B:
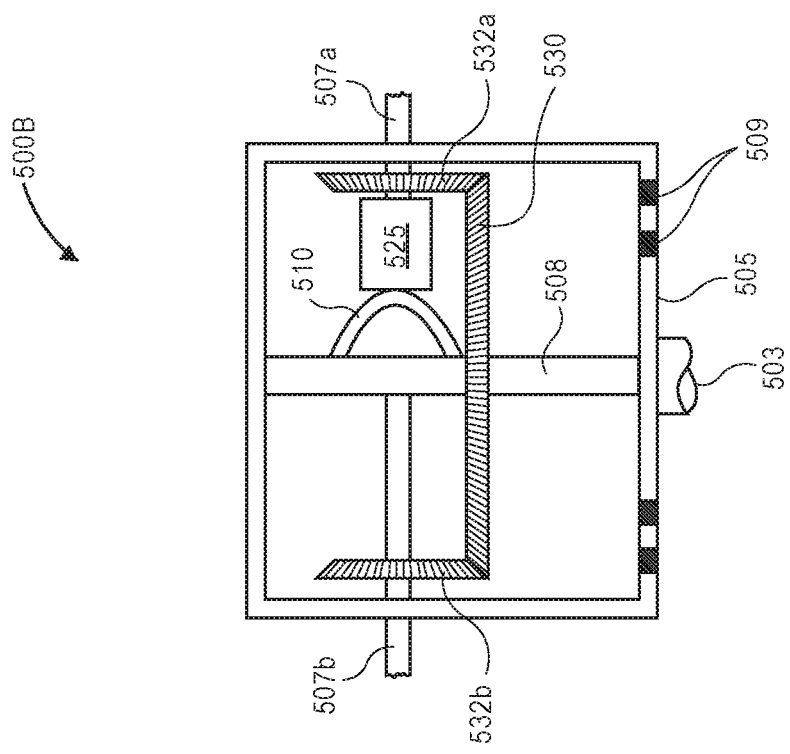
FIG. 5B is a schematic diagram of an eighth example variable pitch propeller hub assembly, according to an implementation.
Figure 5A:
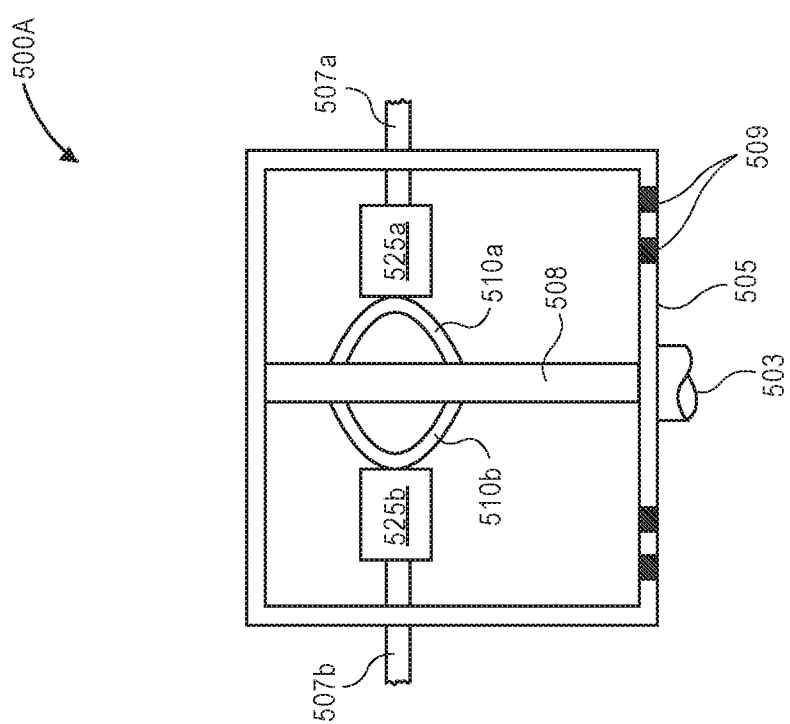
FIG. 5A is a schematic diagram of a seventh example variable pitch propeller hub assembly, according to an implementation.

FIG. 5A is a schematic diagram of a seventh example variable pitch propeller hub assembly 500A, according to an implementation.

The propeller hub assembly 500A may include a propeller hub 505 coupled to and rotated by a shaft 503 that is rotated by a motor (not shown). The propeller hub 505 may include one or more propeller blades 507 that are rotatably coupled to the propeller hub 505. In addition, in some example embodiments, the propeller hub 505 may include one or more slip rings 509 via which current, heat, and/or magnetic fields may be applied to one or more shape memory actuators within the propeller hub 505. Various features or aspects of the motor, shaft 503, propeller hub 505, propeller blades 507, and/or slip rings 509 may be similar to or combined with the description herein of related components.

As shown in FIG. 5A, the propeller hub 505 may include one or more shape memory actuators 510, which may be connected to the one or more slip rings 509 via one or more electrical and/or thermal connections, such as wires or leads (not shown). Further, the propeller hub 505 may include one or more support members 508 to which the one or more shape memory actuators 510 may be coupled. In addition, the one or more propeller blades 507 may be rotatably coupled to the one or more support members 508. Moreover, the propeller hub 505 may also include one or more latch mechanisms 525, e.g., pen extension/retraction mechanisms, ballpoint pen extension/retraction mechanisms, and/or other similar extension/retraction mechanisms, as described herein, operatively connected between the one or more shape memory actuators 510 and the one or more propeller blades 507.

The shape memory actuators 510 may be attached or coupled to the support members 508 of the propeller hub 505. For example, ends of the shape memory actuators 510 may be attached to the support members 508 of the propeller hub 505, such that movement or alteration of the shape memory actuators 510 causes actuation of the latch mechanisms 525 and corresponding rotation of the propeller blades 507. For example, the shape memory actuators 510 may actuate the latch mechanisms 525 to rotate the propeller blades 507 through defined rotational positions of the latch mechanisms 525. In addition, the shape memory actuators 510 may move or alter their size, shape, length, and/or other dimensions between two or more positions or configurations responsive to actuation upon application of current, heat, and/or magnetic fields. For example, the shape memory actuators 510 may move between substantially straight configurations and substantially bent, or U-shaped, configurations.

The latch mechanisms 525 may be attached or coupled to an interior of the propeller hub 505. For example, portions of the latch mechanisms 525 may be coupled to an interior of the propeller hub 505 so as to maintain positions of the latch mechanisms 525 within the propeller hub 505. In addition, first ends of the latch mechanisms 525 may be coupled to the shape memory actuators 510, and second ends of the latch mechanisms 525 may be coupled to the propeller blades 507.

The latch mechanisms 525 may include extension/retraction mechanisms similar to those included in writing implements such as retractable ballpoint pens, in which various interfacing components are spring-loaded or biased relative to each other and axial compression of one component from a first axial position (e.g., associated with a retracted writing tip of a pen) may cause rotation of one or more components within the mechanism, and the compressed component may return to a second axial position (e.g., associated with an extended writing tip of a pen) different from the first axial position due to force from the spring or other bias element. An additional axial compression of the component may then cause further rotation of one or more components within the mechanism, and the compressed component may return to the first axial position (e.g., associated with the retracted writing tip of the pen), due to force from the spring or other bias element. In this manner, such extension/retraction mechanisms may include one or more components that sequentially rotate through a plurality of rotational positions, e.g., an initial rotational position, a second rotational position, a third rotational position, etc., and eventually back to the initial rotational position, responsive to actuation of the mechanisms.

In some example embodiments, the one or more components that sequentially rotate through a plurality of rotational positions of the latch mechanisms 525 may be configured to hold a particular rotational position of the propeller blades 507 upon actuation by the shape memory actuators 510. For example, the shape memory actuators 510 may be actuated upon application of current, heat, and/or magnetic fields, and responsive to such actuation, the one or more components of the latch mechanisms 525 may rotate to a next rotational position of the plurality of rotational positions. Due to the connection between the one or more components of the latch mechanisms 525 and the propeller blades 507, the current rotational position of the one or more components of the latch mechanisms 525 may correspond to a particular rotational position of the propeller blades 507. In this manner, the shape memory actuators 510 may operate substantially as basic actuators, such that the shape memory actuators 510 may not need to be continuously actuated to hold a particular rotational position, thereby reducing power consumption, because the one or more components of the latch mechanisms 525 can operate to hold the particular rotational position of the propeller blades 507.

By selectively and/or controllably actuating the shape memory actuators 510 to actuate the latch mechanisms 525 and rotate the propeller blades 507, the pitches of the propeller blades 507 may be precisely and controllably adjusted as desired between a plurality of positions. Although FIG. 5A shows two shape memory actuators 510a, 510b, two propeller blades 507a, 507b, and two latch mechanisms 525a, 525b, any other number, combination, or arrangement of shape memory actuators, propeller blades, and/or latch mechanisms may be used within the propeller hub assembly 500A. For example, the shape memory actuators may be one-way shape memory actuators, two-way shape memory actuators, or a plurality of shape memory actuators connected in series, each of which may be selectively actuated to more precisely control the alteration in size, shape, length, or other dimensions. In addition, a plurality of propeller blades may each be rotatably coupled to a respective support member 508. Further, each shape memory actuator may independently control rotation of a respective propeller blade with respect to rotation of other propeller blades.

In further example embodiments, instead of or in addition to the shape memory actuators 510, various other types of actuators may be used to actuate the latch mechanisms. For example, servos, solenoids, linear actuators, or various other types of actuators may be used to actuate the latch mechanisms.

FIG. 5B is a schematic diagram of an eighth example variable pitch propeller hub assembly 500B, according to an implementation.

The propeller hub assembly 500B may include a propeller hub 505 coupled to and rotated by a shaft 503 that is rotated by a motor (not shown). The propeller hub 505 may include one or more propeller blades 507 that are rotatably coupled to the propeller hub 505. In addition, in some example embodiments, the propeller hub 505 may include one or more slip rings 509 via which current, heat, and/or magnetic fields may be applied to one or more shape memory actuators within the propeller hub 505. Various features or aspects of the motor, shaft 503, propeller hub 505, propeller blades 507, and/or slip rings 509 may be similar to or combined with the description herein of related components.

As shown in FIG. 5B, the propeller hub 505 may include a shape memory actuator 510, which may be connected to the one or more slip rings 509 via one or more electrical and/or thermal connections, such as wires or leads (not shown). Further, the propeller hub 505 may include one or more support members 508 to which the shape memory actuator 510 may be coupled. In addition, the one or more propeller blades 507 may be rotatably coupled to the one or more support members 508. Furthermore, the propeller hub 505 may also include a latch mechanism 525, e.g., pen extension/retraction mechanisms, ballpoint pen extension/retraction mechanisms, and/or other similar extension/retraction mechanisms, as described herein, operatively connected between the shape memory actuator 510 and a propeller blade 507. Moreover, the propeller hub 505 may include a geared connection, comprising a first portion 530 and second portions 532, that is operatively connected between the shape memory actuator 510 and the propeller blade 507.

The shape memory actuator 510 may be attached or coupled to the support member 508 of the propeller hub 505. For example, ends of the shape memory actuator 510 may be attached to the support member 508 of the propeller hub 505, such that movement or alteration of the shape memory actuator 510 causes actuation of the latch mechanism 525 and corresponding rotation of the propeller blade 507. For example, the shape memory actuator 510 may actuate the latch mechanism 525 to rotate the propeller blade 507 through defined rotational positions of the latch mechanism 525. In addition, the shape memory actuator 510 may move or alter its size, shape, length, and/or other dimensions between two or more positions or configurations responsive to actuation upon application of current, heat, and/or magnetic fields. For example, the shape memory actuator 510 may move between a substantially straight configuration and a substantially bent, or U-shaped, configuration.

The latch mechanism 525 may be attached or coupled to an interior of the propeller hub 505. For example, a portion of the latch mechanism 525 may be coupled to an interior of the propeller hub 505 so as to maintain a position of the latch mechanism 525 within the propeller hub 505. In addition, a first end of the latch mechanism 525 may be coupled to the shape memory actuator 510, and a second end of the latch mechanism 525 may be coupled to the propeller blade 507.

The latch mechanism 525 may include extension/retraction mechanisms similar to those included in writing implements such as retractable ballpoint pens, in which various interfacing components are spring-loaded or biased relative to each other and axial compression of one component from a first axial position (e.g., associated with a retracted writing tip of a pen) may cause rotation of one or more components within the mechanism, and the compressed component may return to a second axial position (e.g., associated with an extended writing tip of a pen) different from the first axial position due to force from the spring or other bias element. An additional axial compression of the component may then cause further rotation of one or more components within the mechanism, and the compressed component may return to the first axial position (e.g., associated with the retracted writing tip of the pen), due to force from the spring or other bias element. In this manner, such extension/retraction mechanisms may include one or more components that sequentially rotate through a plurality of rotational positions, e.g., an initial rotational position, a second rotational position, a third rotational position, etc., and eventually back to the initial rotational position, responsive to actuation of the mechanisms.

In some example embodiments, the one or more components that sequentially rotate through a plurality of rotational positions of the latch mechanism 525 may be configured to hold a particular rotational position of the propeller blades 507 upon actuation by the shape memory actuator 510. For example, the shape memory actuator 510 may be actuated upon application of current, heat, and/or magnetic fields, and responsive to such actuation, the one or more components of the latch mechanism 525 may rotate to a next rotational position of the plurality of rotational positions. Due to the connection between the one or more components of the latch mechanism 525 and the propeller blade 507, the current rotational position of the one or more components of the latch mechanism 525 may correspond to a particular rotational position of the propeller blade 507. In this manner, the shape memory actuator 510 may operate substantially as a basic actuator, such that the shape memory actuator 510 may not need to be continuously actuated to hold a particular rotational position, thereby reducing power consumption, because the one or more components of the latch mechanism 525 can operate to hold the particular rotational position of the propeller blade 507.

The geared connection may be operatively connected between the shape memory actuator 510 and the one or more propeller blades 507 in order to transfer the rotation of the shape memory actuator 510 to others of the one or more propeller blades 507. For example, the first portion 530 of the geared connection may be rotatably coupled to the support member 508, and may comprise a bevel gear having straight or spiral gear teeth. In addition, the second portions 532 may each be coupled to a root or shaft of a respective propeller blade 507, and may comprise bevel gears having corresponding straight or spiral gear teeth that mate with the straight or spiral gear teeth of the first portion 530. In this manner, rotation of a first propeller blade 507a upon actuation of the shape memory actuator 510 that is directly coupled thereto may be transferred via the geared connection, e.g., via a second portion 532a coupled to the first propeller blade 507a, the first portion 530, and a second portion 532b coupled to a second propeller blade 507b, to cause corresponding rotation of the second propeller blade 507b.

By selectively and/or controllably actuating the shape memory actuator 510 to rotate the propeller blades 507, the pitches of the propeller blades 507 may be precisely and controllably adjusted as desired between two or more positions. Although FIG. 5B shows one shape memory actuator 510, two propeller blades 507a, 507b, one support member 508, and one geared connection comprising a first portion 530 and two second portions 532a, 532b, any other number, combination, or arrangement of shape memory actuators, propeller blades, support members, and/or geared connections may be used within the propeller hub assembly 500B. For example, the shape memory actuator may be a one-way shape memory actuator in combination with a bias element, a two-way shape memory actuator, or a plurality of shape memory actuators connected in series, each of which may be selectively actuated to more precisely control the alteration in size, shape, length, or other dimensions. In addition, more than two propeller blades may be operatively connected to the shape memory actuator via the geared connection. Further, a plurality of propeller blades may each be rotatably coupled to a respective support member 508. Moreover, although FIG. 5B shows the first portion of the geared connection as a bevel gear and the second portions of the geared connection as corresponding bevel gears, the first and second portions of the geared connection may comprise other types of gears, e.g., a first portion as a substantially flat disc having gear teeth on an upper surface, and the second portions of the geared connection as substantially spur gears, similar to a circular rack and pinion gear configuration.

In further example embodiments, instead of or in addition to the shape memory actuator 510, various other types of actuators may be used to actuate the latch mechanism. For example, servos, solenoids, linear actuators, or various other types of actuators may be used to actuate the latch mechanism.

FIG. 6A is a schematic diagram of a ninth example variable pitch propeller hub assembly 600A, according to an implementation.

The propeller hub assembly 600A may include a propeller hub 605 coupled to and rotated by a shaft 603 that is rotated by a motor (not shown). The propeller hub 605 may include one or more propeller blades 607 that are rotatably coupled to the propeller hub 605. In addition, in some example embodiments, the propeller hub 605 may include one or more slip rings 609 via which current, heat, and/or magnetic fields may be applied to one or more shape memory actuators within the propeller hub 605. Various features or aspects of the motor, shaft 603, propeller hub 605, propeller blades 607, and/or slip rings 609 may be similar to or combined with the description herein of related components.

As shown in FIG. 6A, the propeller hub 605 may include a shape memory actuator 610, e.g., helical, angular, or rotational shape memory actuator, which may be connected to the one or more slip rings 609 via one or more electrical and/or thermal connections, such as wires or leads (not shown). Further, the propeller hub 605 may include one or more support members 608 to which the one or more propeller blades 607 may be rotatably coupled. Moreover, the propeller hub 605 may include a geared connection, comprising a first portion 630 and second portions 632, that is operatively connected between the shape memory actuator 610 and the propeller blades 607.

The shape memory actuator 610 may be attached or coupled to an interior of the propeller hub 605. For example, a first end of the shape memory actuator 610 may be attached to an interior surface of the propeller hub 605. Further, a second end of the shape memory actuator 610 may be attached to the first portion 630 of the geared connection, e.g., on cylindrical, circular, or otherwise rotating surfaces of the first portion 630, such that movement or alteration of the shape memory actuator 610 causes corresponding rotation of the first portion 630, which in turn causes rotation of the second portions 632 and thereby causes rotation of the propeller blades 607. For example, the shape memory actuator 610 may be coupled to the propeller blades 607 via the first portion 630 and second portions 632 of the geared connection such that rotation of the shape memory actuator 610 in a first direction causes corresponding rotation of the propeller blades 607 in a first direction, e.g., clockwise, and rotation of the shape memory actuator 610 in a second, opposite direction causes corresponding rotation of the propeller blades 607 in a second direction, e.g., counterclockwise. In addition, the shape memory actuator 610 may move or alter its size, shape, length, and/or other dimensions between two or more positions or configurations responsive to actuation upon application of current, heat, and/or magnetic fields. For example, the shape memory actuator 610 may move between a first angular or rotational orientation and a second angular or rotational orientation different from the first orientation.

The geared connection may be operatively connected between the shape memory actuator 610 and the one or more propeller blades 607 in order to transfer the rotation of the shape memory actuator 610 to each of the one or more propeller blades 607. For example, the first portion 630 of the geared connection may be rotatably coupled to the support member 608, and may comprise gear teeth along a circular or annular ring of a circular surface. In addition, the second portions 632 may each be coupled to a root or shaft of a respective propeller blade 607, and may comprise gears having gear teeth that mate with the gear teeth of the first portion 630. In this manner, rotation of the first portion 630 of the geared connection upon actuation of the shape memory actuator 610 that is directly coupled thereto may be transferred via the geared connection, e.g., via the first portion 630 and the second portions 632a, 632b coupled to the propeller blades 607a, 607b, to cause corresponding rotation of each of the propeller blades 607.

By selectively and/or controllably actuating the shape memory actuator 610 to rotate the propeller blades 607, the pitches of the propeller blades 607 may be precisely and controllably adjusted as desired between two or more positions. Although FIG. 6A shows one shape memory actuator 610, two propeller blades 607a, 607b, one support member 608, and one geared connection, any other number, combination, or arrangement of shape memory actuators, propeller blades, support members, and/or geared connections may be used within the propeller hub assembly 600A. For example, the shape memory actuator may be a one-way shape memory actuator in combination with a bias element, a two-way shape memory actuator, or a plurality of shape memory actuators connected in series, each of which may be selectively actuated to more precisely control the alteration in size, shape, length, or other dimensions. In addition, a plurality of propeller blades may each be rotatably coupled to a respective support member 608. Further, the shape memory actuator may collectively control rotation of each of the propeller blades. Moreover, other propeller blades of the propeller hub may not be operatively connected to the shape memory actuator via the geared connection, such that the pitch of such other propeller blades may be varied independently from those propeller blades that are operatively connected to the shape memory actuator via the geared connection. Furthermore, although FIG. 6A shows the first portion of the geared connection as a substantially flat disc having gear teeth on an upper surface, and the second portions of the geared connection as substantially spur gears, e.g., similar to a circular rack and pinion gear configuration, the first and second portions of the geared connection may comprise other types of gears, e.g., bevel gears which may be combinations of straight bevel gears or combinations of spiral bevel gears FIG. 6B is a schematic diagram of a tenth example variable pitch propeller hub assembly 600B, according to an implementation.

The propeller hub assembly 600B may include a propeller hub 605 coupled to and rotated by a shaft 603 that is rotated by a motor (not shown). The propeller hub 605 may include one or more propeller blades 607 that are rotatably coupled to the propeller hub 605. In addition, in some example embodiments, the propeller hub 605 may include one or more slip rings 609 via which current, heat, and/or magnetic fields may be applied to one or more shape memory actuators within the propeller hub 605. Various features or aspects of the motor, shaft 603, propeller hub 605, propeller blades 607, and/or slip rings 609 may be similar to or combined with the description herein of related components.

As shown in FIG. 6B, the propeller hub 605 may include a shape memory actuator 610, which may be connected to the one or more slip rings 609 via one or more electrical and/or thermal connections, such as wires or leads (not shown). Further, the propeller hub 605 may include one or more support members 608 to which the one or more propeller blades 607 may be rotatably coupled. Furthermore, the propeller hub 605 may also include a latch mechanism 625, e.g., pen extension/retraction mechanisms, ballpoint pen extension/retraction mechanisms, and/or other similar extension/retraction mechanisms, as described herein, operatively connected between the shape memory actuator 610 and the propeller blades 607. Moreover, the propeller hub 605 may include a geared connection, comprising a first portion 630 and second portions 632, that is operatively connected between the shape memory actuator 610 and the propeller blades 607.

The shape memory actuator 610 may be attached or coupled to an interior of the propeller hub 605. For example, ends of the shape memory actuator 610 may be attached to an interior surface of the propeller hub 605, such that movement or alteration of the shape memory actuator 610 causes actuation of the latch mechanism 625 and corresponding rotation of the first portion 630, which causes rotation of the second portions 632 and thereby causes rotation of the propeller blades 607. For example, the shape memory actuator 610 may actuate the latch mechanism 625 to rotate the first portion 630 of the geared connection through defined rotational positions of the latch mechanism 625, thereby causing rotation of the second portions 632 and corresponding rotation of the propeller blades 607. In addition, the shape memory actuator 610 may move or alter its size, shape, length, and/or other dimensions between two or more positions or configurations responsive to actuation upon application of current, heat, and/or magnetic fields. For example, the shape memory actuator 610 may move between a substantially straight configuration and a substantially bent, or U-shaped, configuration.

The latch mechanism 625 may be attached or coupled to an interior of the propeller hub 605. For example, a portion of the latch mechanism 625 may be coupled to an interior of the propeller hub 605 so as to maintain a position of the latch mechanism 625 within the propeller hub 605. In addition, a first end of the latch mechanism 625 may be coupled to the shape memory actuator 610, and a second end of the latch mechanism 625 may be coupled to the first portion 630.

The latch mechanism 625 may include extension/retraction mechanisms similar to those included in writing implements such as retractable ballpoint pens, in which various interfacing components are spring-loaded or biased relative to each other and axial compression of one component from a first axial position (e.g., associated with a retracted writing tip of a pen) may cause rotation of one or more components within the mechanism, and the compressed component may return to a second axial position (e.g., associated with an extended writing tip of a pen) different from the first axial position due to force from the spring or other bias element. An additional axial compression of the component may then cause further rotation of one or more components within the mechanism, and the compressed component may return to the first axial position (e.g., associated with the retracted writing tip of the pen), due to force from the spring or other bias element. In this manner, such extension/retraction mechanisms may include one or more components that sequentially rotate through a plurality of rotational positions, e.g., an initial rotational position, a second rotational position, a third rotational position, etc., and eventually back to the initial rotational position, responsive to actuation of the mechanisms.

In some example embodiments, the one or more components that sequentially rotate through a plurality of rotational positions of the latch mechanism 625 may be configured to hold a particular rotational position of the first portion 630 upon actuation by the shape memory actuator 610. For example, the shape memory actuator 610 may be actuated upon application of current, heat, and/or magnetic fields, and responsive to such actuation, the one or more components of the latch mechanism 625 may rotate to a next rotational position of the plurality of rotational positions. Due to the connection between the one or more components of the latch mechanism 625 and the first portion 630, the current rotational position of the one or more components of the latch mechanism 625 may correspond to a particular rotational position of the first portion 630, which may in turn correspond to particular rotational positions of the second portions 632 and coupled propeller blades 607. In this manner, the shape memory actuator 610 may operate substantially as a basic actuator, such that the shape memory actuator 610 may not need to be continuously actuated to hold a particular rotational position, thereby reducing power consumption, because the one or more components of the latch mechanism 625 can operate to hold the particular rotational position of the first portion 630, which may in turn correspond to particular rotational positions of the second portions 632 and coupled propeller blades 607.

The geared connection may be operatively connected between the shape memory actuator 610 and the one or more propeller blades 607 in order to transfer the rotation of the latch mechanism 625 caused by actuation of the shape memory actuator 610 to each of the one or more propeller blades 607. For example, the first portion 630 of the geared connection may be rotatably coupled to the support member 608, and may comprise a bevel gear having straight or spiral gear teeth. In addition, the second portions 632 may each be coupled to a root or shaft of a respective propeller blade 607, and may comprise bevel gears having corresponding straight or spiral gear teeth that mate with the straight or spiral gear teeth of the first portion 630. In this manner, rotation of the first portion 630 of the geared connection upon actuation of the latch mechanism 625 by the shape memory actuator 610 that is directly coupled thereto may be transferred via the geared connection, e.g., via the first portion 630 and the second portions 632*a*, 632*b* coupled to the propeller blades 607*a*, 607*b*, to cause corresponding rotation of each of the propeller blades 607.

By selectively and/or controllably actuating the shape memory actuator 610 to rotate the propeller blades 607, the pitches of the propeller blades 607 may be precisely and controllably adjusted as desired between two or more positions. Although FIG. 6B shows one shape memory actuator 610, two propeller blades 607*a*, 607*b*, one support member 608, one latch mechanism 625, and one geared connection, any other number, combination, or arrangement of shape memory actuators, propeller blades, support members, latch mechanisms, and/or geared connections may be used within the propeller hub assembly 600B. For example, the shape memory actuator may be a one-way shape memory actuator in combination with a bias element, a two-way shape memory actuator, or a plurality of shape memory actuators connected in series, each of which may be selectively actuated to more precisely control the alteration in size, shape, length, or other dimensions. In addition, a plurality of propeller blades may each be rotatably coupled to a respective support member 608. Further, the shape memory actuator and latch mechanism may collectively control rotation of each of the propeller blades. Moreover, other propeller blades of the propeller hub may not be operatively connected to the shape memory actuator via the latch mechanism and the geared connection, such that the pitch of such other propeller blades may be varied independently from those propeller blades that are operatively connected to the shape memory actuator via the latch mechanism and the geared connection. Moreover, although FIG. 6B shows the first portion of the geared connection as a bevel gear and the second portions of the geared connection as corresponding bevel gears, the first and second portions of the geared connection may comprise other types of gears, e.g., a first portion as a substantially flat disc having gear teeth on an upper surface, and the second portions of the geared connection as substantially spur gears, similar to a circular rack and pinion gear configuration.

In further example embodiments, instead of or in addition to the shape memory actuator 610, various other types of actuators may be used to actuate the latch mechanism. For example, servos, solenoids, linear actuators, or various other types of actuators may be used to actuate the latch mechanism.

Further, although FIGS. 2A to 6B generally illustrate shape memory actuators that are disposed within an interior of a propeller hub, in other example embodiments, the shape memory actuators may be connected to or associated with a portion, side wall, and/or end wall of the propeller hub, and/or the shape memory actuators may be disposed at an exterior of the propeller hub. For example, with respect to FIGS. 2A and 2B, the shape memory actuators may be associated with a portion of or disposed at an exterior of the propeller hub, and may also be operatively connected to the linkage arms and/or the propeller blades to change pitches of the propeller blades. In addition, with respect to FIGS. 3A and 3B, the shape memory actuators may be associated with a portion of or disposed at an exterior of the propeller hub, and may also be operatively connected to the linkage arms, the propeller blades, and/or the latch mechanisms to change pitches of the propeller blades. Further, with respect to FIGS. 4A and 4B, the shape memory actuators may be associated with a portion of or disposed at an exterior of the propeller hub, and may also be operatively connected to the propeller blades to change pitches of the propeller blades. Moreover, with respect to FIGS. 5A and 5B, the shape memory actuators may be associated with a portion of or disposed at an exterior of the propeller hub, and may also be operatively connected to the propeller blades and/or the latch mechanisms to change pitches of the propeller blades. Furthermore, with respect to FIGS. 6A and 6B, the shape memory actuators may be associated with a portion of or disposed at an exterior of the propeller hub, and may also be operatively connected to the geared connections, the propeller blades, and/or the latch mechanisms to change pitches of the propeller blades.

Figure 7:
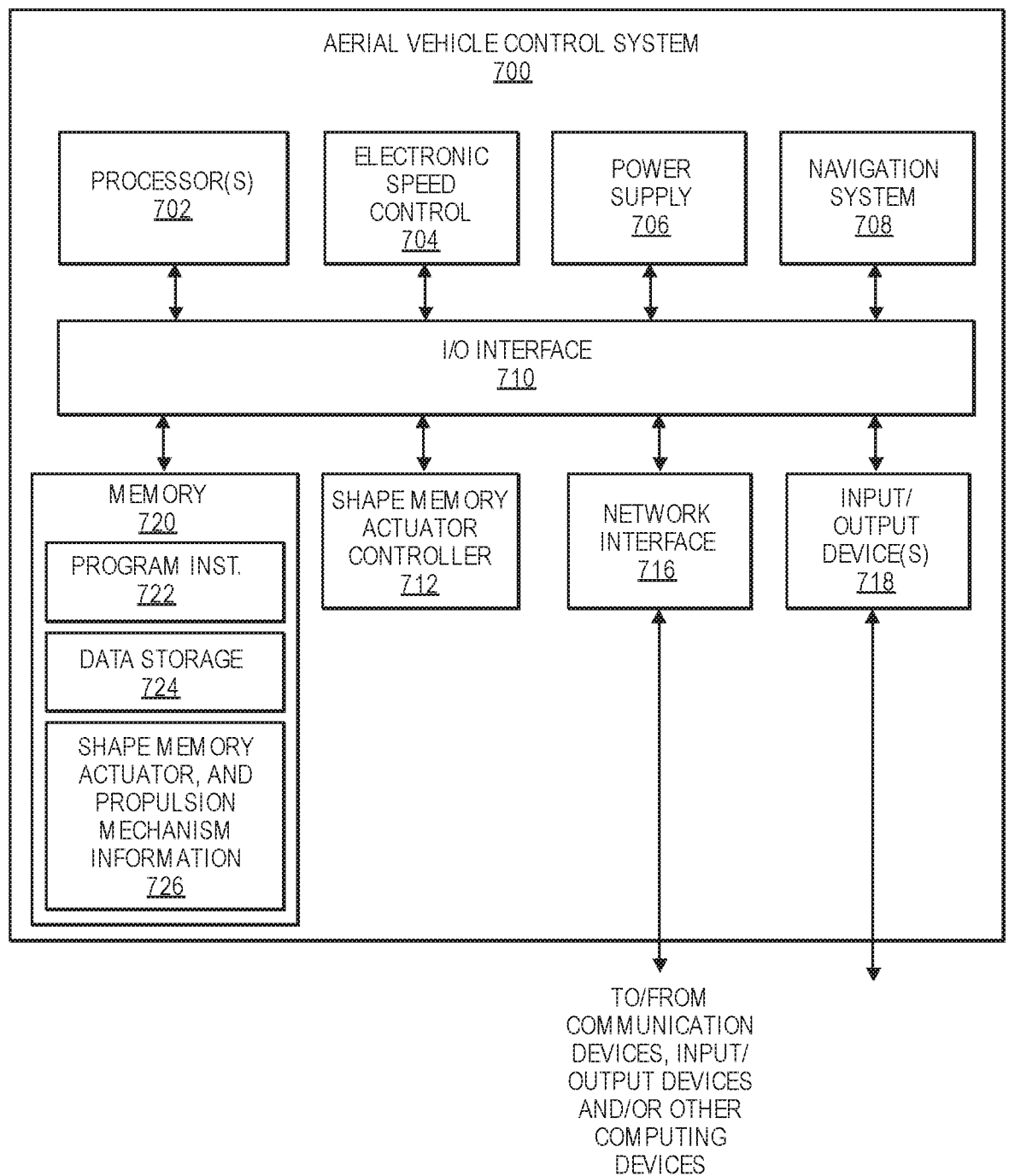
FIG. 7 is a block diagram illustrating various components of an aerial vehicle control system, according to an implementation.

FIG. 7 is a block diagram illustrating various components of an aerial vehicle control system 700, according to an implementation. In various examples, the block diagram may be illustrative of one or more aspects of an aerial vehicle control system 700 that may be used to implement the various systems and processes discussed above. In the illustrated implementation, the aerial vehicle control system 700 includes one or more processors 702, coupled to a non-transitory computer readable storage medium 720 via an input/output (I/O) interface 710. The aerial vehicle control system 700 may also include a propulsion controller or electronic speed control 704, a power supply or power controller module 706 and/or a navigation system 708. The aerial vehicle control system 700 further includes a shape memory actuator controller 712, a network interface 716, and one or more input/output devices 718.

In various implementations, the aerial vehicle control system 700 may be a uniprocessor system including one processor 702, or a multiprocessor system including several processors 702 (e.g., two, four, eight, or another suitable number). The processor(s) 702 may be any suitable processor capable of executing instructions. For example, in various implementations, the processor(s) 702 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 702 may commonly, but not necessarily, implement the same ISA.

The non-transitory computer readable storage medium 720 may be configured to store executable instructions, data, shape memory actuator and propulsion mechanism information and/or data items accessible by the processor(s) 702. In various implementations, the non-transitory computer readable storage medium 720 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 720 as program instructions 722, data storage 724 and shape memory actuator and propulsion mechanism information 726, respectively. In other implementations, program instructions, data and/or shape memory actuator and propulsion mechanism information may be received, sent or stored upon different types of computer-accessible media, such as non-transitory media, or on similar media separate from the non-transitory computer readable storage medium 720 or the aerial vehicle control system 700. Shape memory actuator and propulsion mechanism information may include, for example, the type, size, shape, length, dimensions, number, materials, configurations, or other characteristics or properties of the shape memory actuators, type, size, materials, configurations, or other characteristics or properties of the propeller hubs, type, size, number, materials, configurations, pitches, or other characteristics or properties of the propeller blades, type, size, placement, number, materials, configurations, or other characteristics or properties of the slip rings or sources to actuate the shape memory actuators, type, size, number, materials, configurations, or other characteristics or properties of the linkage arms and/or bias elements, type, size, number, materials, configurations, axial positions, rotational positions, or other characteristics or properties of the latch mechanisms, gear type, size, teeth, materials, configurations, or other characteristics or properties of the geared connections, and/or other data items and information.

Generally speaking, a non-transitory, computer readable storage medium may include storage media or memory media such as magnetic or optical media, e.g., disk or CD/DVD-ROM, coupled to the aerial vehicle control system 700 via the I/O interface 710. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 716.

In one implementation, the I/O interface 710 may be configured to coordinate I/O traffic between the processor(s) 702, the non-transitory computer readable storage medium 720, and any peripheral devices, the network interface 716 or other peripheral interfaces, such as input/output devices 718. In some implementations, the I/O interface 710 may perform any necessary protocol, timing or other data transformations to convert data signals from one component (e.g., non-transitory computer readable storage medium 720) into a format suitable for use by another component (e.g., processor(s) 702). In some implementations, the I/O interface 710 may include support for devices attached through various types of peripheral buses, such as a variant of the Peripheral Component Interconnect (PCI) bus standard or the Universal Serial Bus (USB) standard, for example. In some implementations, the function of the I/O interface 710 may be split into two or more separate components, such as a north bridge and a south bridge, for example. Also, in some implementations, some or all of the functionality of the I/O interface 710, such as an interface to the non-transitory computer readable storage medium 720, may be incorporated directly into the processor(s) 702.

The propulsion controller or electronic speed control 704 communicates with the navigation system 708 and adjusts the operational characteristics of each propulsion mechanism to guide the aerial vehicle along a determined path and/or to perform other navigational maneuvers. The navigation system 708 may include a GPS or other similar system than can be used to navigate the aerial vehicle to and/or from a location.

The aerial vehicle control system 700 may also include a shape memory actuator controller 712. The shape memory actuator controller 712 may communicate with sources of heat, current, and/or magnetic fields that may be activated to apply heat, current, and/or magnetic fields to one or more shape memory actuators. In example embodiments, heat, current, and/or magnetic fields may be applied based on instructions from the shape memory actuator controller 712 via one or more slip rings, e.g., pancake slip rings, wireless slip rings, or other types of slip rings, or via other direct or indirect electrical, thermal, and/or magnetic connections.

The network interface 716 may be configured to allow data to be exchanged between the aerial vehicle control system 700, other devices attached to a network, such as other computer systems, sources of heat, current, and/or magnetic fields, aerial vehicle control systems of other aerial vehicles, and/or aerial vehicle management systems. For example, the network interface 716 may enable wireless communication between numerous aerial vehicles. In various implementations, the network interface 716 may support communication via wireless general data networks, such as a Wi-Fi network. For example, the network interface 716 may support communication via telecommunications networks such as cellular communication networks, satellite networks, and the like.

Input/output devices 718 may, in some implementations, include one or more displays, visual input/output devices, image capture devices, thermal sensors, infrared sensors, time of flight sensors, ammeters, magnetometers, accelerometers, gyroscopes, audio input/output devices, pressure sensors, weather sensors, etc. Multiple input/output devices 718 may be present and controlled by the aerial vehicle control system 700. One or more of these sensors may be utilized to assist in the operation of the variable pitch propulsion mechanisms described herein.

As shown in FIG. 7, the memory may include program instructions 722 which may be configured to implement the example processes and/or sub-processes described above. The data storage 724 and shape memory actuator and propulsion mechanism information 726 may include various data stores for maintaining data items that may be provided for operating the variable pitch propulsion mechanisms, including shape memory actuators, linkage arms, latch mechanisms, and/or geared connections, as described herein.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Each process described herein may be implemented by the architectures described herein or by other architectures. The processes are illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

Those skilled in the art will appreciate that the aerial vehicle control system 700 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The aerial vehicle control system 700 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 700. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the aerial vehicle control system 700 may be transmitted to the aerial vehicle control system 700 via transmission media or signals, such as electrical, electromagnetic, or digital signals, conveyed via a communication medium, such as a network and/or a wireless link. Various implementations may further include receiving, sending or storing instructions and/or data implemented in accordance with the foregoing description upon a computer-accessible medium. Accordingly, the techniques described herein may be practiced with other aerial vehicle control system configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various processes and systems as illustrated in the figures and described herein represent example implementations. The processes and systems may be implemented in software, hardware, or a combination thereof in other implementations. Similarly, the order of any process may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. An aerial vehicle, comprising:
   a frame;
   a motor coupled to the frame; and
   a propeller hub rotated by the motor, the propeller hub comprising:
      at least one propeller blade rotatably coupled to the propeller hub;
      a shape memory actuator disposed within an interior of the propeller hub;
      a latch mechanism configured to be actuated by the shape memory actuator; and
      a linkage arm operatively connected between the latch mechanism and the at least one propeller blade;
      wherein actuation of the latch mechanism by the shape memory actuator causes the latch mechanism to move between a plurality of positions, thereby causing a change in pitch of the at least one propeller blade via the linkage arm.

2. The aerial vehicle of claim 1, wherein the shape memory actuator is integrated into at least a portion of the linkage arm.

3. The aerial vehicle of claim 1, wherein the propeller hub further comprises:
   a slip ring associated with the propeller hub;
   wherein at least one of heat, current, or magnetic field is applied to the shape memory actuator via the slip ring.

4. The aerial vehicle of claim 1, wherein the latch mechanism comprises a bias element, and is actuatable between at least two positions by the shape memory actuator.

5. A propeller hub, comprising:
   at least one propeller blade rotatably coupled to the propeller hub;
   a shape memory actuator associated with the propeller hub and operatively connected to the at least one propeller blade; and
   a linkage arm operatively connected between the shape memory actuator and the at least one propeller blade;
   wherein actuation of the shape memory actuator comprises an extension or retraction that causes a change in pitch of the at least one propeller blade via the linkage arm.

6. The propeller hub of claim 5, wherein the shape memory actuator is integrated into at least a portion of the linkage arm.

7. The propeller hub of claim 5, further comprising:
   a latch mechanism configured to be actuated by the shape memory actuator;
   wherein the linkage arm is operatively connected between the latch mechanism and the at least one propeller blade; and
   wherein actuation of the latch mechanism by the shape memory actuator causes the change in pitch of the at least one propeller blade via the linkage arm.

8. The propeller hub of claim 5, further comprising:
   a slip ring associated with the propeller hub;
   wherein at least one of heat, current, or magnetic field is applied to the shape memory actuator via the slip ring.

9. A propeller hub, comprising:
at least one propeller blade rotatably coupled to the propeller hub; and
a shape memory actuator associated with the propeller hub and operatively connected to the at least one propeller blade;
wherein the shape memory actuator is directly coupled to the at least one propeller blade;
wherein actuation of the shape memory actuator comprises an angular extension or retraction that causes a change in pitch of the at least one propeller blade;
wherein the propeller hub comprises a plurality of propeller blades rotatably coupled to the propeller hub; and
wherein the propeller hub further comprises a geared connection operatively connecting the plurality of propeller blades such that the actuation of the shape memory actuator causes the change in pitch of the plurality of propeller blades.

10. A propeller hub, comprising:
at least one propeller blade rotatably coupled to the propeller hub;
a shape memory actuator associated with the propeller hub and operatively connected to the at least one propeller blade; and
a latch mechanism directly coupled to the at least one propeller blade and configured to be actuated by the shape memory actuator; and
wherein actuation of the latch mechanism by the shape memory actuator comprises an angular movement that causes a change in pitch of the least one propeller blade.

11. A propeller hub, comprising:
at least one propeller blade rotatably coupled to the propeller hub;
a shape memory actuator associated with the propeller hub and operatively connected to the at least one propeller blade; and
a geared connection operatively connected between the shape memory actuator and the at least one propeller blade;
wherein the actuation of the shape memory actuator comprises an angular movement of a first portion of the geared connection that causes a change in pitch of the at least one propeller blade via a second portion of the geared connection.

12. The propeller hub of claim 11, wherein the propeller hub comprises a plurality of propeller blades rotatably coupled to the propeller hub; and
wherein the geared connection operatively connects the plurality of propeller blades such that the actuation of the shape memory actuator causes the change in pitch of the plurality of propeller blades via respective second portions of the geared connection.

13. The propeller hub of claim 11, further comprising:
a latch mechanism operatively connected between the shape memory actuator and the geared connection and configured to be actuated by the shape memory actuator; and
wherein the actuation of the latch mechanism by the shape memory actuator comprises an angular movement of the first portion of the geared connection that causes the change in pitch of the at least one propeller blade via the second portion of the geared connection.

14. A method to operate a propulsion mechanism, comprising:
changing a pitch of at least one propeller blade that is rotatably coupled to a propeller hub by applying at least one of heat, current, or magnetic field to a shape memory actuator that is associated with the propeller hub;
wherein changing the pitch of the at least one propeller blade comprises moving a linkage arm by at least one of extending or retracting the shape memory actuator;
wherein the linkage arm is operatively connected between the shape memory actuator and the at least one propeller blade.

15. A method to operate a propulsion mechanism, comprising:
changing a pitch of at least one propeller blade that is rotatably coupled to a propeller hub by applying at least one of heat, current, or magnetic field to a shape memory actuator that is associated with the propeller hub;
wherein the shape memory actuator is operatively connected to the at least one propeller blade;
wherein changing the pitch of the at least one propeller blade comprises:
rotating a first portion of a geared connection by at least one of angularly extending or retracting the shape memory actuator;
wherein a second portion of the geared connection is directly coupled to the at least one propeller blade and is rotated by rotation of the first portion of the geared connection.

16. A method to operate a propulsion mechanism, comprising:
changing a pitch of at least one propeller blade that is rotatably coupled to a propeller hub by applying at least one of heat, current, or magnetic field to a shape memory actuator that is associated with the propeller hub;
wherein the shape memory actuator is operatively connected to the at least one propeller blade;
wherein changing the pitch of the at least one propeller blade comprises:
actuating a latch mechanism by at least one of extending or retracting the shape memory actuator;
wherein the latch mechanism is operatively connected between the shape memory actuator and the at least one propeller blade.

* * * * *